US012591994B2

(12) United States Patent
Peng et al.

(10) Patent No.: US 12,591,994 B2
(45) Date of Patent: Mar. 31, 2026

(54) USING LIGHT AND SHADOW IN VISION-AIDED PRECISE POSITIONING

(71) Applicant: QUALCOMM Incorporated, San Diego, CA (US)

(72) Inventors: Yuxiang Peng, Sunnyvale, CA (US); Gengsheng Zhang, Cupertino, CA (US); Ning Luo, Cupertino, CA (US); Yuhua Hu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 18/328,404

(22) Filed: Jun. 2, 2023

(65) Prior Publication Data

US 2024/0404098 A1    Dec. 5, 2024

(51) Int. Cl.
*G06T 7/70* (2017.01)
*G06T 7/246* (2017.01)
*G06T 7/277* (2017.01)
*G06T 7/55* (2017.01)

(52) U.S. Cl.
CPC ............... *G06T 7/70* (2017.01); *G06T 7/248* (2017.01); *G06T 7/277* (2017.01); *G06T 7/55* (2017.01)

(58) Field of Classification Search
CPC ........... G06T 7/70; G06T 7/277; G06T 7/248; G06T 7/55; G06T 7/579; G06T 7/73; G01S 19/14; G01S 19/22; G01S 19/485; G01S 2205/01; G01S 5/16
See application file for complete search history.

(56) References Cited

U.S. PATENT DOCUMENTS

| | | | |
|---|---|---|---|
| 2014/0240293 A1* | 8/2014 | McCaughan | ......... G06F 3/0426 345/175 |
| 2019/0005675 A1* | 1/2019 | Burrough | ............. H04N 9/3179 |
| 2021/0209785 A1* | 7/2021 | Unnikrishnan | ...... G06V 10/764 |

\* cited by examiner

*Primary Examiner* — Emily C Terrell
*Assistant Examiner* — Amanda H Pearson
(74) *Attorney, Agent, or Firm* — Procopio, Cory, Hargreaves & Savitch LLP/QUALCOMM Incorporated

(57) ABSTRACT

Aspects presented herein may improve/enhance camera-aided/assisted positioning by utilizing light and shadow created by an artificial light. In one aspect, a UE captures a set of images of an object using at least one camera. The UE estimates a direction of at least one light source based on a shadow of the object in the set of images, wherein the shadow of the object is created by the at least one light source. The UE calculates at least one of (1) a distance (d) between the at least one camera and a set of first features associated with the object based on the estimated direction of the at least one light source or (2) directional information of a set of second features associated with a surrounding environment that is within a threshold distance of the object.

28 Claims, 16 Drawing Sheets

$\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

$\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

V1: Forward heading vector of a camera
V2: matching road vector based on the map information Direction/ angle likely to be under NLOS/ multipath Example skyplot

90°

135°

45°

180°

0°

225°

315°

270°

1214

1210

1212

1210

1202

Space Vehicle (SV) /Satellite
(N = Satellite ID)

1200

1300

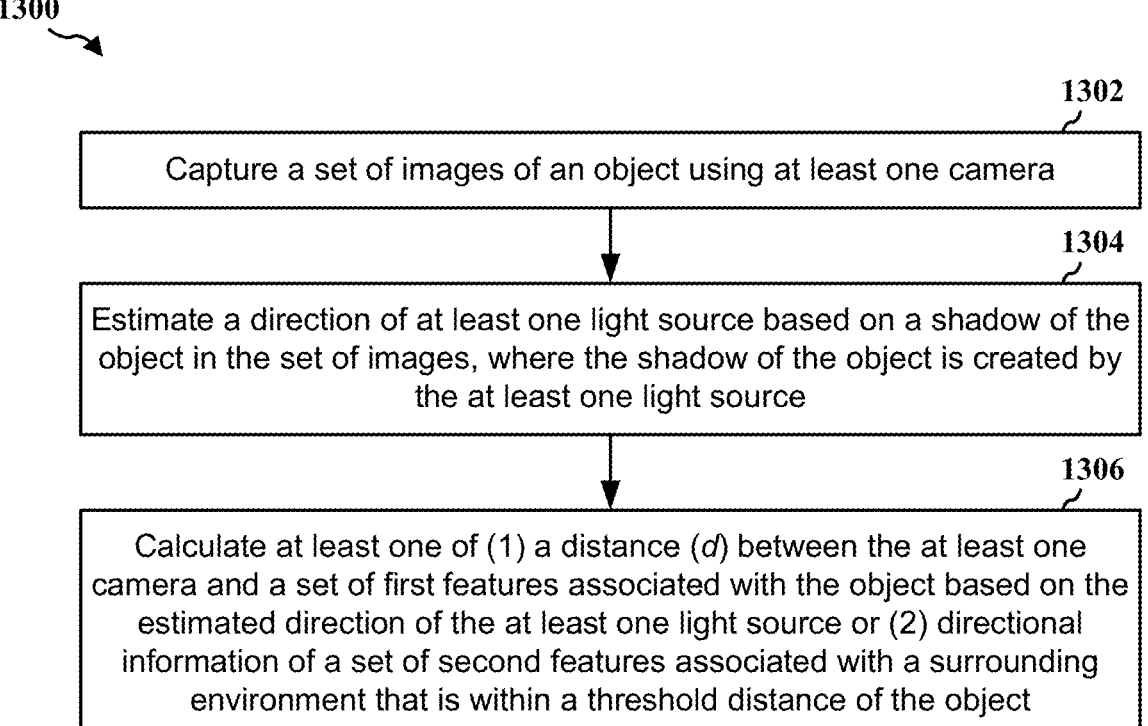

1302

Capture a set of images of an object using at least one camera

1304

Estimate a direction of at least one light source based on a shadow of the object in the set of images, where the shadow of the object is created by the at least one light source

1306

Calculate at least one of (1) a distance ($d$) between the at least one camera and a set of first features associated with the object based on the estimated direction of the at least one light source or (2) directional information of a set of second features associated with a surrounding environment that is within a threshold distance of the object

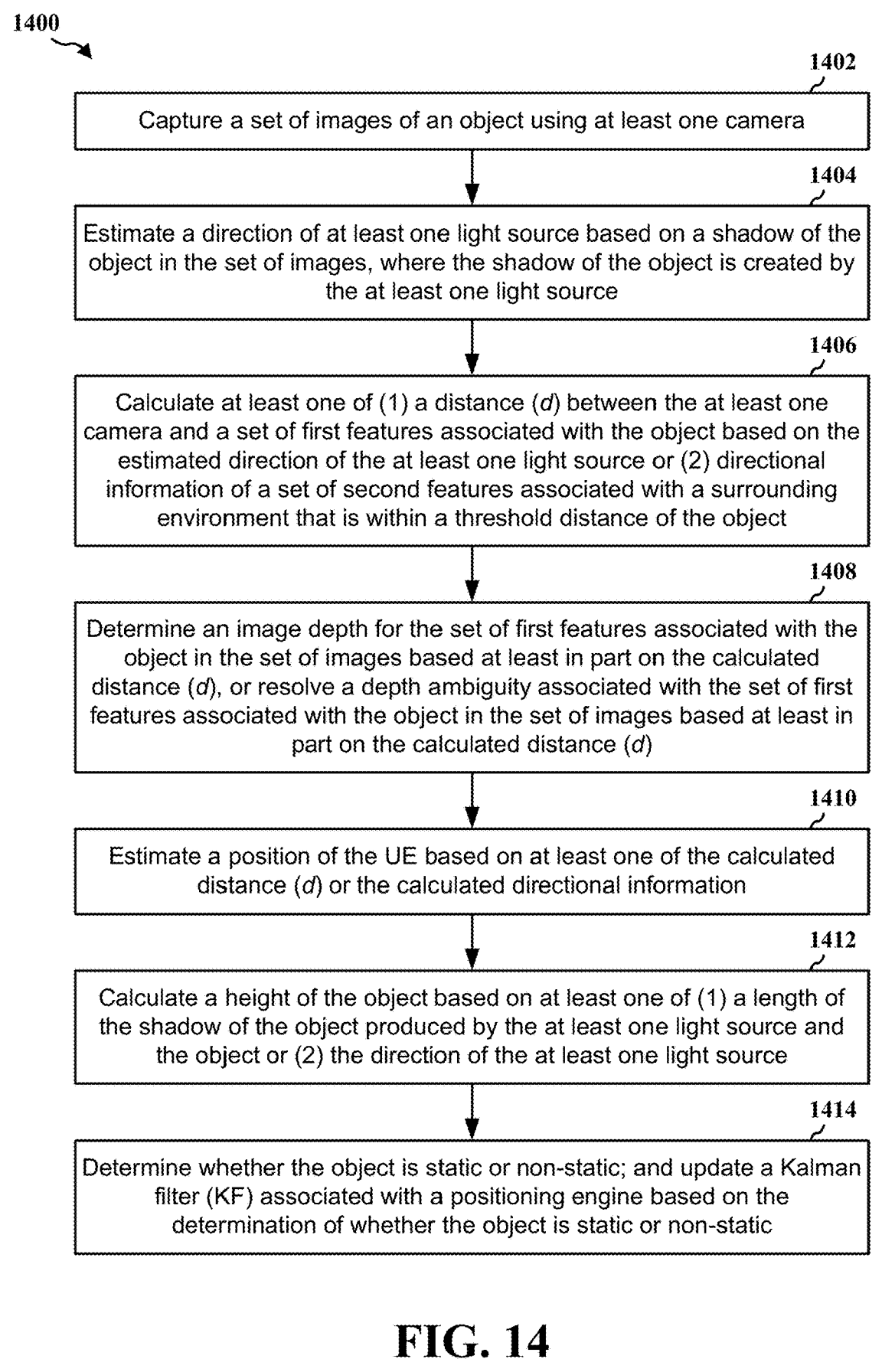

Capture a set of images of an object using at least one camera

1404

Estimate a direction of at least one light source based on a shadow of the object in the set of images, where the shadow of the object is created by the at least one light source

1406

Calculate at least one of (1) a distance ($d$) between the at least one camera and a set of first features associated with the object based on the estimated direction of the at least one light source or (2) directional information of a set of second features associated with a surrounding environment that is within a threshold distance of the object

1408

Determine an image depth for the set of first features associated with the object in the set of images based at least in part on the calculated distance ($d$), or resolve a depth ambiguity associated with the set of first features associated with the object in the set of images based at least in part on the calculated distance ($d$)

1410

Estimate a position of the UE based on at least one of the calculated distance ($d$) or the calculated directional information

1412

Calculate a height of the object based on at least one of (1) a length of the shadow of the object produced by the at least one light source and the object or (2) the direction of the at least one light source

1414

Determine whether the object is static or non-static; and update a Kalman filter (KF) associated with a positioning engine based on the determination of whether the object is static or non-static

FIG. 14

USING LIGHT AND SHADOW IN VISION-AIDED PRECISE POSITIONING

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus captures a set of images of an object using at least one camera. The apparatus estimates a direction of at least one light source based on a shadow of the object in the set of images, where the shadow of the object is created by the at least one light source. The apparatus calculates at least one of (1) a distance (d) between the at least one camera and a set of first features associated with the object based on the estimated direction of the at least one light source or (2) a directional information of a set of second features associated with a surrounding environment that is within a threshold distance of the object.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 13 is a flowchart of a method of wireless communication.

FIG. 14 is a flowchart of a method of wireless communication.

DETAILED DESCRIPTION

Figure 1:
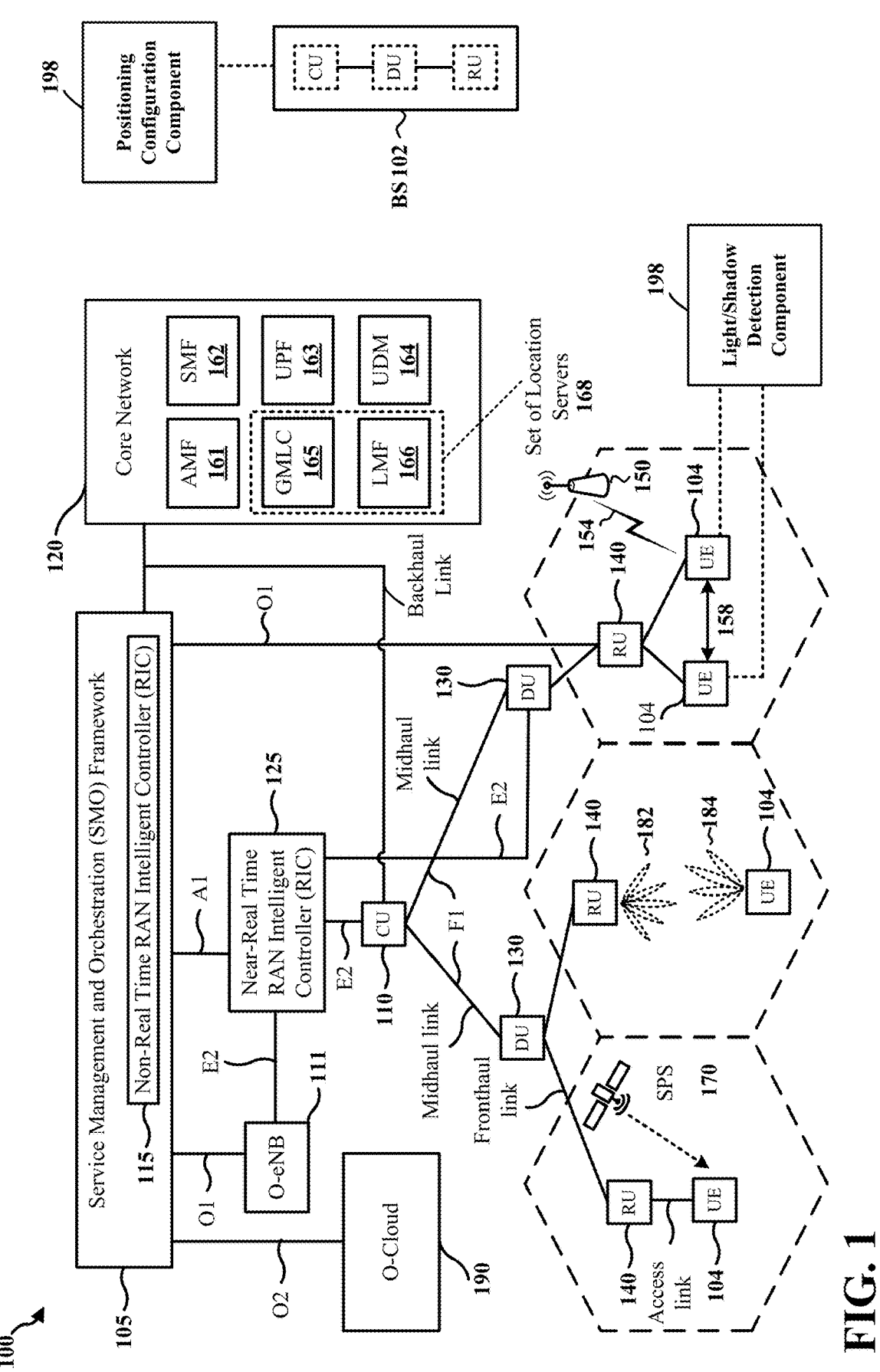
FIG. 1 is a diagram illustrating an example of a wireless communications system and an access network.

Aspects presented herein may improve/enhance camera-aided/assisted positioning (e.g., vision-aided precise positioning (VAPP)") by utilizing light and the shadow created by the artificial light, where light and/or shadow generated by different devices and/or environment may be used for aiding the visual positioning of a target (e.g., a UE equipped with a camera, an object captured by a camera, etc.). In one aspect, artificial light may include self-light source(s) associated with a positioning device such as a UE, e.g., a headlight of a vehicle (or vehicle UE), a flashlight of a smartphone, etc. The artificial light may also include external light source(s), such as lights from other devices (e.g., other UEs, vehicles, etc.) that are with known locations (e.g., for side-link devices) and/or with unknown locations (e.g., for enhanced simultaneous localization and mapping (SLAM) features)), etc. Based on utilizing artificial light source(s), aspects presented herein may enable single camera feature localization using triangulation, feature dynamic determination, UE attitude (e.g., heading) determination with map matching, and nearby situation awareness (vehicle heading, multipath/NLOS).

For example, during Global Navigation Satellite Systems (GNSS) outage, inertial measurement unit (IMU) bias can degrade positioning accuracy and IMU bias can degrade sensor alignment/heading ambiguity with a static start. In one aspect, vision-aided precise positioning is used to mitigate issues related to IMU and GNSS coupling. Using a vehicle's headlight, a geometry connection between the vehicle and near-by features are established to obtain a radial distance between vehicle and the feature. In another aspect, using a vehicle's headlight and corresponding shadow locations are used to determine if an object is static or not. In another aspect, light shadow from the vehicle is used to determine vehicle heading/pose. In a further aspect, nearby UE/vehicle localization is estimated by tracking their headlight pattern. In situations where a camera cannot directly see all obstacles in a limited field of view (FOV), shadow caused by nearby objects can be used to determine azimuth and elevation blockage ranges for the GNSS and low Earth orbit (LEO) non-terrestrial network (NTN) receiver receivers. Aspects presented herein may apply to nighttime cases when visible features are less available, garage and tunnels scenario without low feature availability (static start), road condition is bad (low visibility land-mark), floor level positioning (elevated bridges), and/or indoor augmented reality (AR) and Internet-of-Things (IoT) use cases with camera, etc.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a light/shadow detection component 198 that may be configured to capture a set of images of an object using at least one camera; estimate a direction of at least one light source based on a shadow of the object in the set of images, where the shadow of the object is created by the at least one light source; and calculate at least one of (1) a distance (d) between the at least one camera and a set of first features associated with the object based on the estimated direction of the at least one light source or (2) directional information of a set of second features associated with a surrounding environment that is within a threshold distance of the object. In certain aspects, the base station 102 may include a positioning configuration component 199 that may be configured to configure positioning related parameters for the UE 104.

Figure 2:
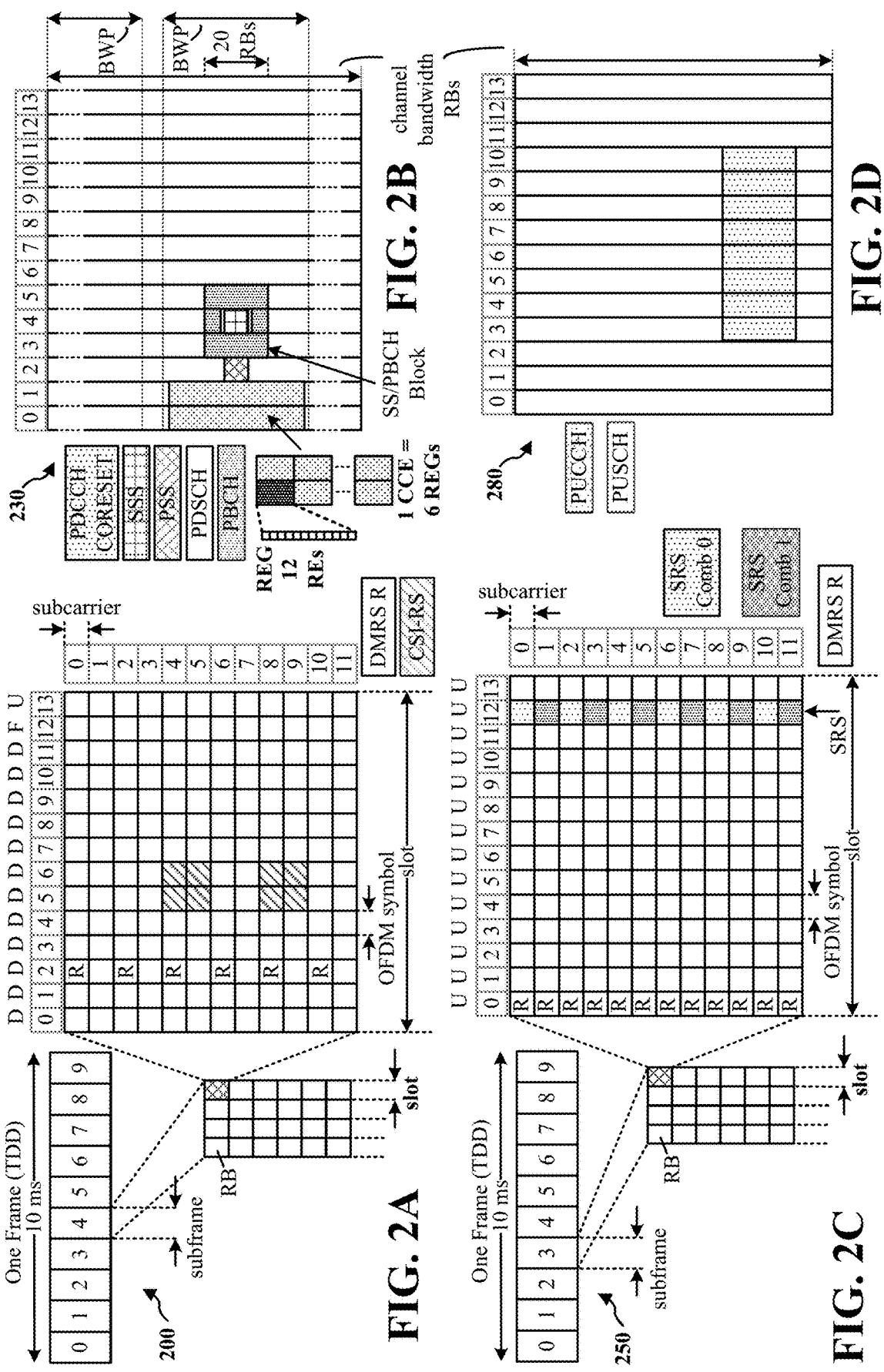
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| μ | SCS $\Delta f = 2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
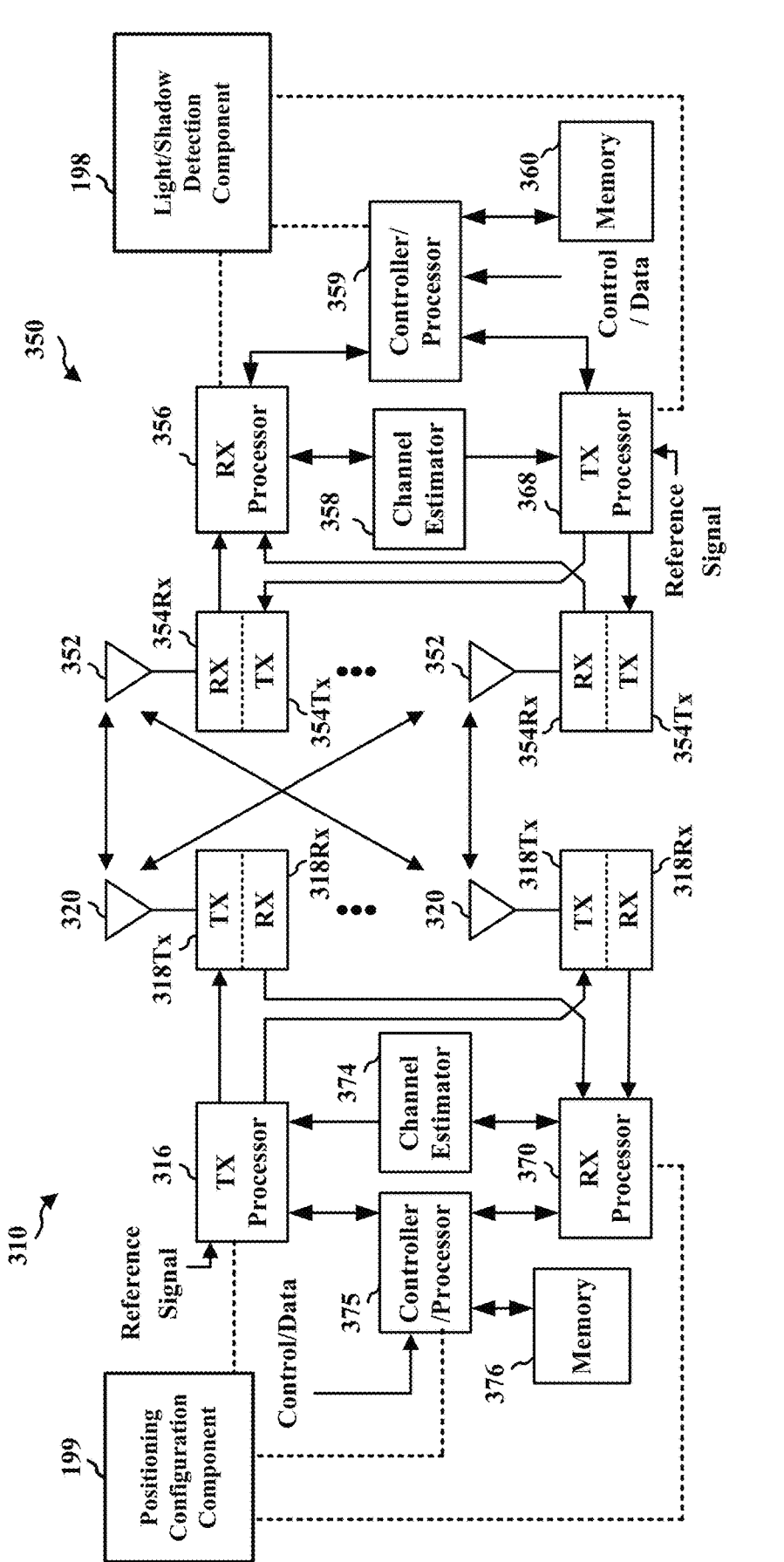
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the light/shadow detection component 198 of FIG. 1.

At least one of the TX processor 316, the RX processor 370, and the controller/processor 375 may be configured to perform aspects in connection with the positioning configuration component 199 of FIG. 1.

Figure 4:
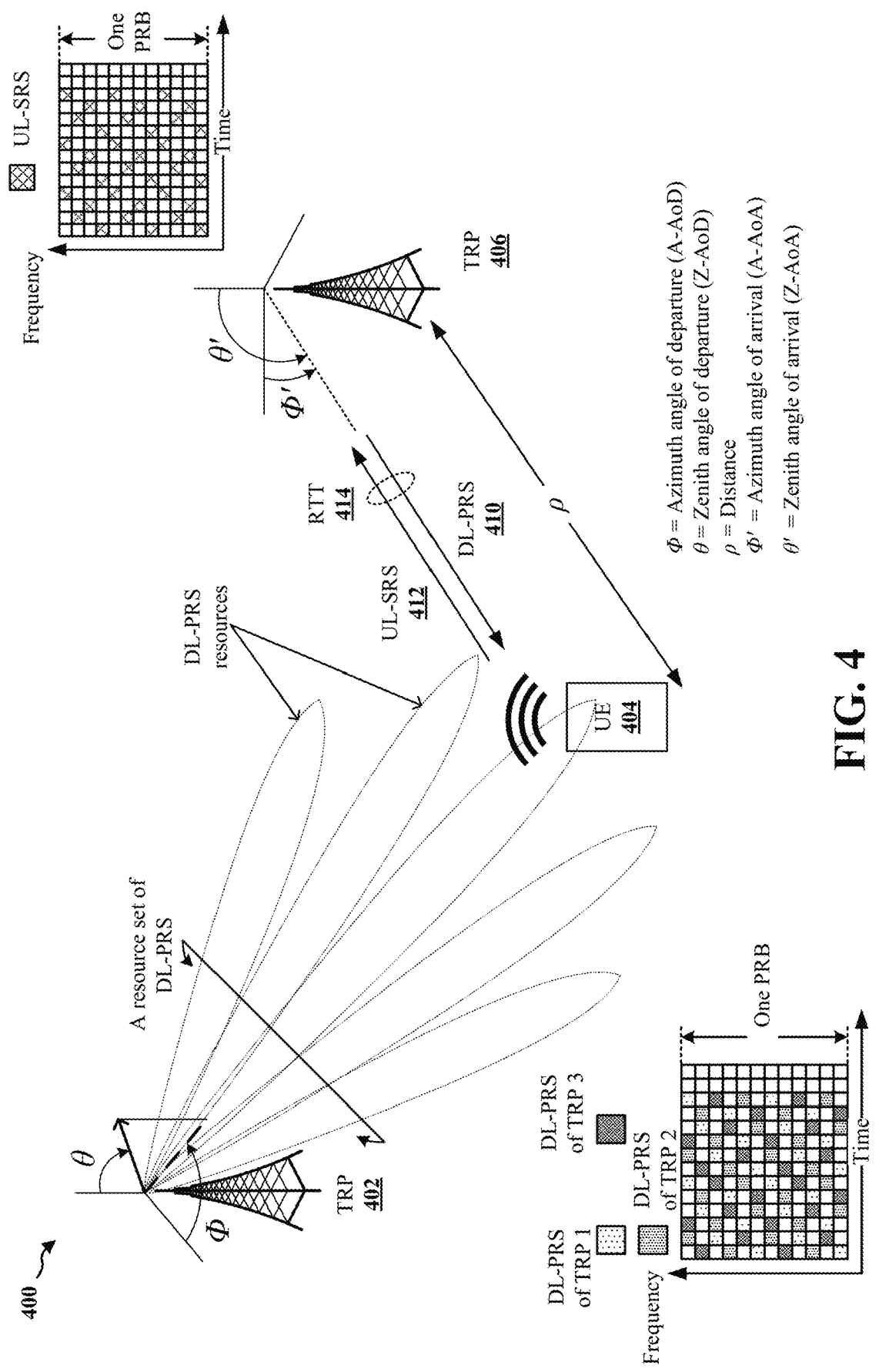
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402,406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR. TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning. PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

Figure 16:
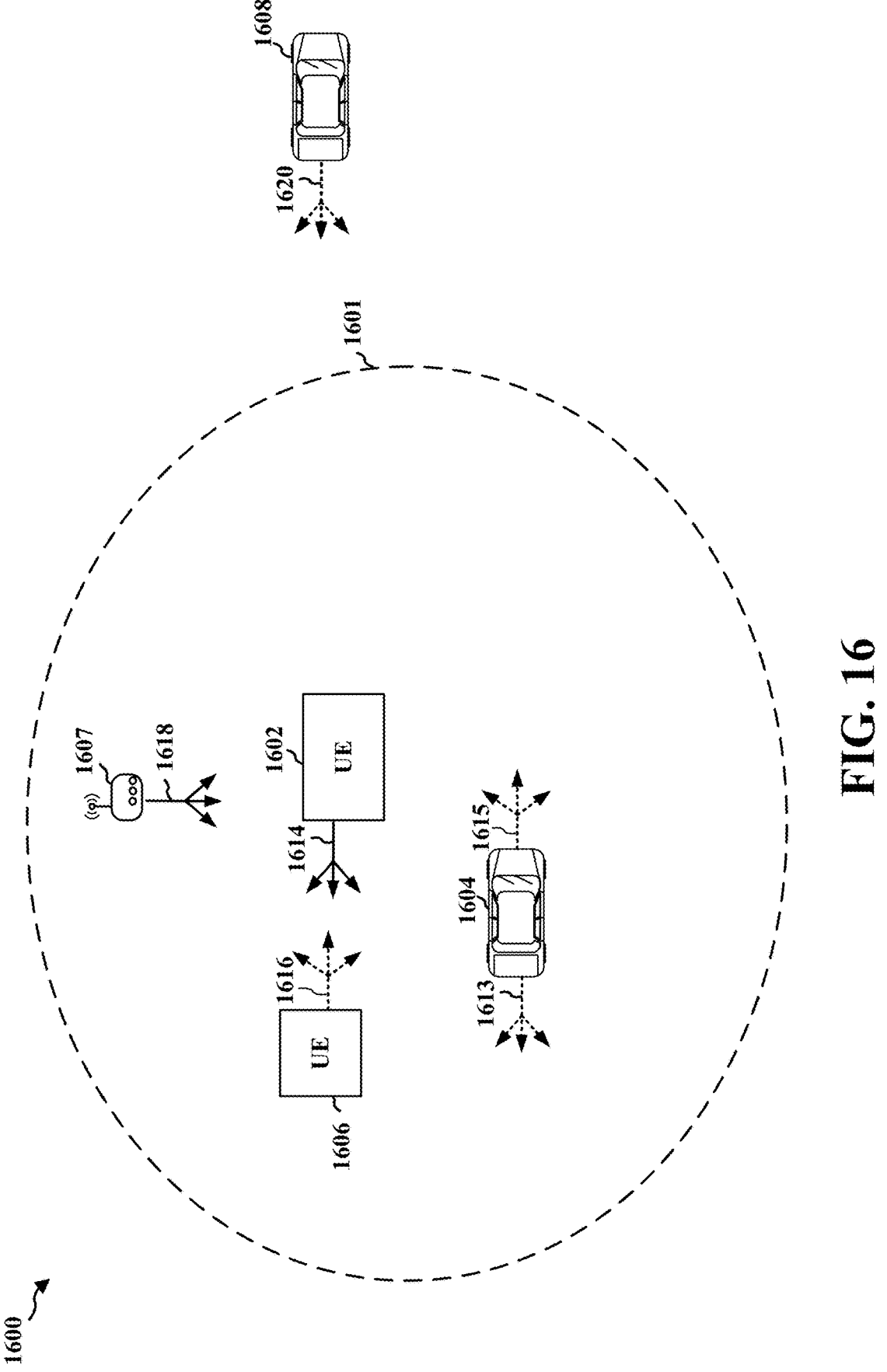
FIG. 16 illustrates example aspects of sidelink communication between devices in accordance with various aspects of the present disclosure.

FIG. 16 illustrates an example 1600 of sidelink communication between devices. The communication may be based on a slot structure similar to aspects described in connection with FIG. 2. For example, the UE 1602 may transmit a sidelink transmission 1614, e.g., including a control channel (e.g., PSCCH) and/or a corresponding data channel (e.g., PSSCH), that may be received by UEs 1604, 1606, 1608. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that may be occupied by the data transmission. The SCI may be used by receiving devices to avoid interference by refraining from transmitting on the reserved resources. The UEs 1602, 1604, 1606, 1608 may each be capable of sidelink transmission in addition to sidelink reception. Thus, UEs 1604, 1606, 1608 are illustrated as transmitting sidelink transmissions 1613, 1615, 1616, 1620. The sidelink transmissions 1613, 1614, 1615, 1616, 1620 may be unicast, broadcast or multicast to nearby devices. For example, UE 1604 may transmit sidelink transmissions 1613, 1615 intended for receipt by other UEs within a range 1601 of UE 1604, and UE 1606 may transmit sidelink transmission 1616. Additionally, or alternatively, RSU 1607 may receive communication from and/ or transmit communication transmission 1618 to UEs 1602, 1604, 1606, 1608. One or more of the UEs 1602, 1604, 1606, 1608 or the RSU 1607 may include a transmission prioritization component 198 and/or a transmission coexistence component 199 as described in connection with FIG. 1.

Sidelink communication may be based on one or more transmission modes. In one transmission mode for a first radio access technologies (RAT) (which may be referred to herein as "Mode 4" of a first RAT), a wireless device may autonomously select resources for transmission. A network entity may allocate one or more sub-channels for wireless devices to transmit one or more transport blocks (TB) using the one or more channels. A wireless device may randomly reserve an allocated resource for one-shot transmissions. A wireless device may use a sensing-based semi-persistent transmission scheme, or semi-persistent scheduling (SPS) mode, to select a reserved resource for transmission. For example, before selecting a resource for data transmission, a wireless device may first determine whether resources have been reserved by another wireless device. Semi-persistent transmission allows a wireless device to take advantage of semi-periodic traffic arrival by using historical interference patterns to predict future interference patterns. The wireless device may sense at least one of priority information, energy sensing information, or PSCCH decoding information to optimize resource selection. In one aspect, a wireless device may avoid selecting resources for a transmission that are scheduled to be used for a higher priority packet transmission. In another aspect, a wireless device may rank resources according to how much energy is received, and may pick the lowest energy resources. In another aspect, a wireless device may avoid resources for whom control is decoded or for which the received energy may be above a threshold.

A network entity may configure the periodicity of the reserved sub-channels using DCI transmitted over a PDCCH. The period of a semi-persistent transmission resource may be, for example, 20, 50, 100, 200, 300, 400, 500, 600, 700, 800, 900, or 1000 milliseconds (ms). Such a periodicity may be referred to as a resource reservation period (RSVP). In alternative embodiments, the periodicity may be referred to as a resource reservation interval (RRI). A network entity may limit the possible values for the periodicity of the transmission resource. A wireless device, such as a UE, may select a transmission resource based on the periodicity of an arrival packet. A counter may be used to trigger periodic reselections. For example, a wireless device may randomly select a counter between 5 and 15, and may reserve a resource based on the counter (e.g., 10*counter resource reservation periods, a number of MAC protocol data unit (PDU) transmissions equal to the counter). After every transmission, or after a reservation period passes, the counter may be decremented until it hits zero. For example, where a reservation period is 100 ms and a counter is 10, every 100 ms the counter may decrement until one second(s) passes, upon which the wireless device may then reselect a sidelink resource. In one aspect, the wireless device may reselect the sidelink resource based on a re-selection probability value. For example, in response to the counter decrementing to zero, the wireless device may reselect the sidelink resource an x % of the time, and may not reselect the sidelink resource (1−x) % of the time, where x<1. The wireless device may then reset the counter and repeat the process when the counter decrements to zero again. A wireless device may measure a received signal strength indicator (RSSI) measurement for each slot of 100 ms, and may then calculate the RSSI of the frequency band resource as an average of each of the 10 RSSI measurements taken over the period of one second. A wireless device may select a preferred frequency band resource as a resource that is in one of the bottom 20% of ranked RSSI calculated resources for a wireless device. In some aspects, the counter may be decremented after every MAC PDU transmission. A wireless device may be configured to reselect a sidelink resource after a counter expires (i.e., reaches zero), and a MAC PDU is received.

Sidelink communication for other RATs may be based on different types or modes of resource allocation mechanisms. In another resource allocation mode for a second RAT (which may be referred to herein as "Mode 1" of a second RAT), centralized resource allocation may be provided by a network entity. For example, a network entity may determine resources for sidelink communication and may allocate resources to different wireless devices to use for sidelink transmissions. In this first mode, a wireless device may receive an allocation of sidelink resources from a base station. In a second resource allocation mode (which may be referred to herein as "Mode 2"), distributed resource allocation may be provided. In Mode 2, each wireless device may autonomously determine resources to use for sidelink transmission. In order to coordinate the selection of sidelink resources by individual wireless devices, each wireless device may use a sensing technique to monitor for resource reservations by other sidelink wireless devices and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a wireless device may reserve resources for transmission in a current slot and up to two future slots (discussed below).

Thus, in the second mode (e.g., Mode 2), individual wireless devices may autonomously select resources for sidelink transmission, e.g., without a central entity such as a base station indicating the resources for the device. A first wireless device may reserve the selected resources in order to inform other wireless devices about the resources that the first wireless device intends to use for sidelink transmission(s).

In some examples, the resource selection for sidelink communication may be based on a sensing-based mechanism. For instance, before selecting a resource for a data transmission, a wireless device may previously determine whether resources have been reserved by other wireless devices.

For example, as part of a sensing mechanism for a resource allocation mode 2 of a second RAT, a wireless device may determine (e.g., sense) whether a selected sidelink resource has been reserved by other wireless device(s) before selecting a sidelink resource for a data transmission. If the wireless device determines that the sidelink resource has not been reserved by other wireless devices, the wireless device may use the selected sidelink resource for transmitting the data, e.g., in a PSSCH transmission. The wireless device may estimate or determine which radio resources (e.g., sidelink resources) may be in-use and/or reserved by others by detecting and decoding sidelink control information (SCI) transmitted by other wireless devices. The wireless device may use a sensing-based resource selection algorithm to estimate or determine which radio resources are in-use and/or reserved by others. The wireless device may receive SCI from another wireless device that may include reservation information based on a resource reservation field in the SCI. The wireless device may continuously monitor for (e.g., sense) and decode SCI from peer wireless devices. The SCI may include reservation information, e.g., indicating slots and RBs that a particular wireless device has selected for a future transmission. The wireless device may exclude resources that are used and/or reserved by other wireless devices from a set of candidate resources for sidelink transmission by the wireless device, and the wireless device may select/reserve resources for a sidelink transmission from the resources that are unused and therefore form the set of candidate resources. A wireless device may continuously perform sensing for SCI with resource reservations in order to maintain a set of candidate resources from which the wireless device may select one or more resources for a sidelink transmission. Once the wireless device selects a candidate resource, the wireless device may transmit SCI indicating its own reservation of the resource for a sidelink transmission. The number of resources (e.g., sub-channels per subframe) reserved by the wireless device may depend on the size of data to be transmitted by the wireless device. Although the example is described for a wireless device receiving reservations from another wireless device, the reservations may be received from an RSU or other device communicating based on sidelink.

In addition to Global Navigation Satellite Systems (GNSS)-based positioning and network-based positioning (e.g., as described in connection with FIG. 4), various camera-based positioning has also been developed to provide alternative/additional positioning mechanisms/modes. Camera-based positioning, which may also be referred to as "camera-based visual positioning," "visual positioning"

and/or "vision-based positioning," is a positioning mechanism/mode that uses images captured by at least one camera to determine the location of a target (e.g., a UE or a transportation that is equipped with the at least one camera, an object that is in view of the at least one camera, etc.). For example, images captured by the dashboard camera (dash cam) of a vehicle may be used for calculating the three-dimensional (3D) position and/or 3D orientation of the vehicle while the vehicle is moving. Similarly, images captured by the camera of a mobile device may be used for estimating the location of the mobile device user or the location of one or more objects in the images. In some implementations, camera-based positioning may provide centimeter-level and 6-degrees-of-freedom (6 DOF) positioning. 6 DOF may refer to a representation of how an object moves through 3D space by either translating linearly or rotating axially (e.g., 6 DOF=3D position+3D attitude). For example, a single-degree-of-freedom on an object may be controlled by the up/down, forward/back, left/right, pitch, roll, or yaw. Camera-based positioning has great potential for various applications, especially in satellite signal (e.g., GNSS/GPS signal) degenerated/unavailable environments.

In some scenarios, images captured by a camera may also be used for improving the accuracy/reliability of other positioning mechanisms/modes (e.g., the GNSS-based positioning, the network-based positioning, etc.), which may be referred to as "vision-aided positioning," "camera-aided positioning," "camera-aided location," and/or "camera-aided perception," etc. For example, while GNSS and/or inertial measurement unit (IMU) may provide good positioning/localization performance, when GNSS measurement outage occurs, the overall positioning performance might degrade due to IMU bias drifting. Thus, images captured by the camera may provide valuable information to reduce errors. For purposes of the present disclosure, a positioning session (e.g., a period of time in which one or more entities are configured to determine the position of a UE) that is associated with camera-based positioning or camera-aided positioning may be referred to as a camera-based positioning session or a camera-aided positioning session. In some examples, the camera-based positioning and/or the camera-aided positioning may be associated with an absolute position of the UE, a relative position of the UE, an orientation of the UE, or a combination thereof.

Figure 5:
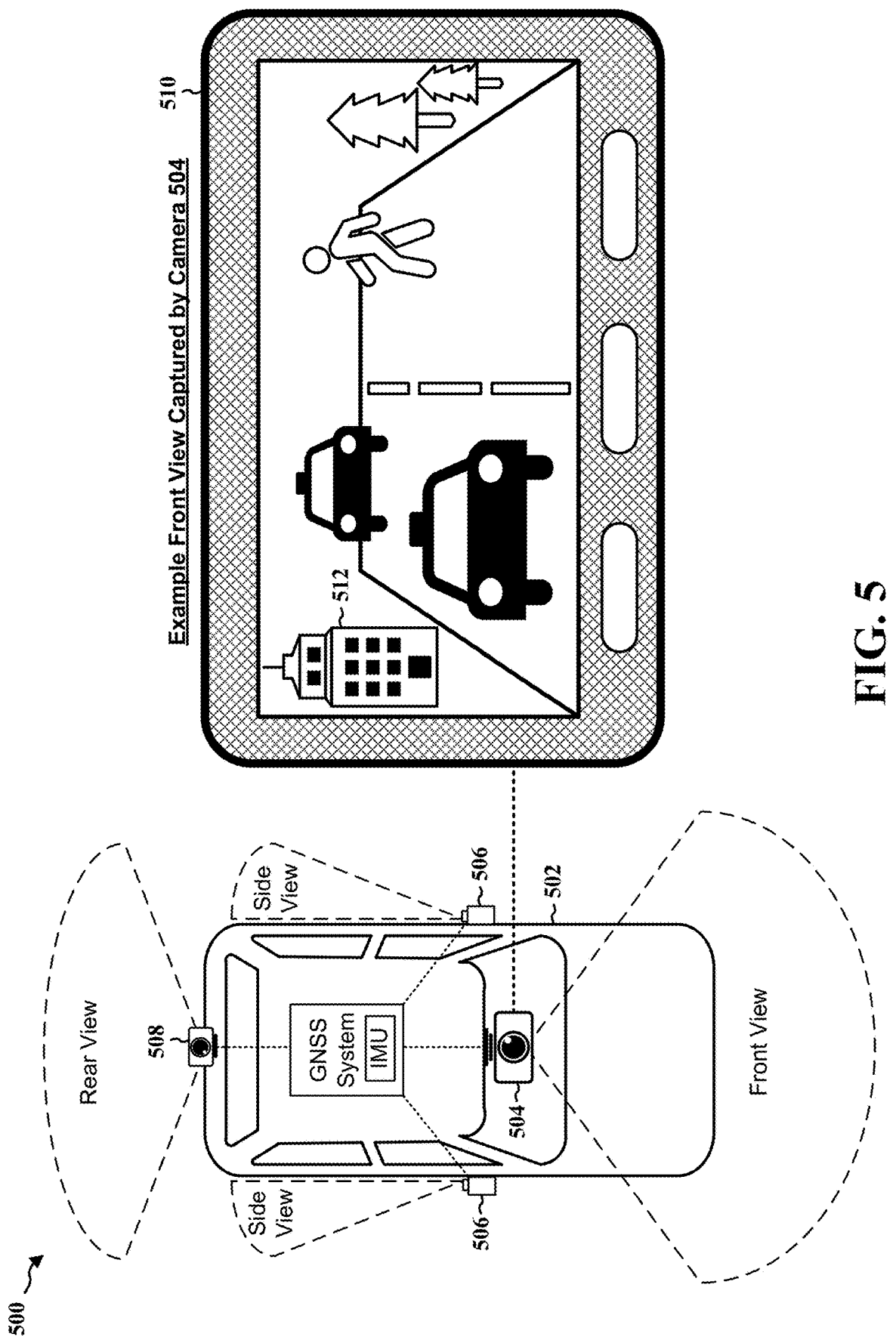
FIG. 5 is a diagram illustrating an example of camera-aided positioning in accordance with various aspects of the present disclosure.

FIG. 5 is a diagram 500 illustrating an example of camera-aided positioning in accordance with various aspects of the present disclosure. A vehicle 502 may be equipped with a GNSS system and a set of cameras, which may include a front camera 504 (for capturing the front view of the vehicle 502), side cameras 506 (for capturing the side views of the vehicle 502), and/or a rear camera 508 (for capturing the front view of the vehicle 502), etc. In some examples, the GNSS system may further include or be associated with at least one IMU (e.g., a GNSS+IMU system). While FIG. 5 uses the vehicle 502 as an example, it is merely for illustration purposes. Aspects presented herein may also apply to other types of transportations (e.g., motorcycles, bicycles, buses, trains, etc.), devices (e.g., UEs on pedestrians), and/or positioning mechanisms/modes (e.g., network-based positioning described in connection with FIG. 4). In addition, for purposes of the present disclosure, a positioning mechanism/mode (e.g., GNSS-based positioning, network-based positioning, etc.) that uses at least one sensor (e.g., an IMU, a camera) to assist the positioning may be referred to as a sensor fusion positioning.

The GNSS system may estimate the location of the vehicle 502 based on receiving GNSS signals transmitted from multiple satellites (e.g., based on performing GNSS-based positioning). However, when the GNSS signals are not available or weak, such as when the vehicle 502 is in an urban area or in a tunnel, the estimated location of the vehicle 502 may become inaccurate. Thus, in some implementations, the set of cameras on the vehicle 502 may be used for assisting the positioning, such as for verifying whether the location estimated by the GNSS system based on the GNSS signals is accurate. For example, as shown at 510, images captured by the front camera 504 of the vehicle 502 may include/identify a specific building 512 (which may also be referred to as a feature) that is with a known location, and the vehicle 502 (or the GNSS system or a positioning engine associated with the vehicle 502) may determine/verify whether the location (e.g., the longitude and latitude coordinates) estimated by the GNSS system is in proximity to the known location of this specific building 512. Thus, with the assistance of the camera(s), the accuracy and reliability of the GNSS-based positioning may be further improved. For purposes of the present disclosure, a GNSS system that is associated with a camera (e.g., capable of performing camera-aided/based positioning) may be referred to as a "GNSS+camera system," or a "GNSS+IMU+camera system" (if the GNSS system is also associated with/includes at least one IMU).

In some examples, a software or an application that accepts positioning related measurements from GNSS chipsets and/or sensors to estimate position, velocity, and/or altitude of a device may be referred to as a positioning engine. In addition, a positioning engine that is capable of achieving certain high level of accuracy (e.g., centimeter/decimeter level accuracy) and/or latency may be referred to as a precise positioning engine (PPE). For example, a positioning engine that is capable of performing real-time kinematic positioning (RTK) (e.g., receiving or processing correction data associated with RTK) may be considered as a PPE. Another example of PPE is a positioning engine that is capable of performing precise point positioning (PPP). PPP is a positioning technique that removes or models GNSS system errors to provide a high level of position accuracy from a single receiver.

In some scenarios, while precise positioning technology using a GNSS system and at least one IMU sensor coupling (e.g., a GNSS+IMU system) may enable highly accurate location solutions, the IMU bias drifting may still degrade the accuracy of positioning during a GNSS outage. Such IMU bias may also lead to an initial sensor alignment/heading ambiguity with a static start. However, similar to camera-aided positioning, if information obtained from one or more cameras are used appropriately (e.g., the camera vision is used opportunistically), the aforementioned problems associated with IMU and GNSS coupling (e.g., the GNSS+IMU system) may be mitigated with useful and reliable vision features, which may be referred to as "vision-aided precise positioning (VAPP)" for purposes of the present disclosure.

While camera-based/camera-aided positioning (which may also be referred to as computer vision and/or feature-based positioning in some examples) may use features (e.g., the specific building 512) in captured images to perform or assist positioning of a target, cameras may be affected by (susceptible to) environmental lighting conditions, image noise, and/or availability of features, etc. For example, a GNSS/IMU positioning engine may be benefitted from visual information provided by a camera when environmental conditions are favorable for the camera. However, when the visual feature quality provided by the camera is low or the information provided by the camera is misleading, the overall positioning performance may be degraded. For example, some challenges in the VAPP may include vision feature stability and availability, such as when the camera is used at night or in a monotonous environment. Also, at nighttime and/or dark places (e.g., in a tunnel, garage, underground structure, etc.), positioning based on computer vision (CV) and VAPP may become more challenging due to poorer lighting condition and less available features.

Aspects presented herein may improve/enhance camera-aided/assisted positioning (e.g., the VAPP) by utilizing light and/or shadow created by the artificial light, where light and/or shadow generated by different devices and/or environment may be used for aiding the visual positioning of a target (e.g., a UE equipped with a camera, an object captured by a camera, etc.). For purposes of the present disclosure, a shadow may refer to a dark area or shape produced by a body coming between rays of light and a surface. In one aspect, artificial light may include self-light source(s) associated with a positioning device such as a UE, e.g., a headlight of a vehicle (or vehicle UE), a flashlight of a smartphone, etc. A headlight may refer to a light at the front of a vehicle. A vehicle may refer to a thing used for transporting people or goods. Examples of a vehicle include a car, a truck, a plane, a train, a cart, etc. The artificial light may also include external light source(s), such as lights from other devices (e.g., other UEs, vehicles, etc.) that are with known locations (e.g., for side-link devices) and/or with unknown locations (e.g., for enhanced simultaneous localization and mapping (SLAM) features)), etc. Based on utilizing artificial light source(s), aspects presented herein may enable single camera feature localization using triangulation, feature dynamic determination, UE attitude (e.g., heading) determination with map matching, and nearby situation awareness (vehicle heading, multipath/NLOS).

Figure 6:
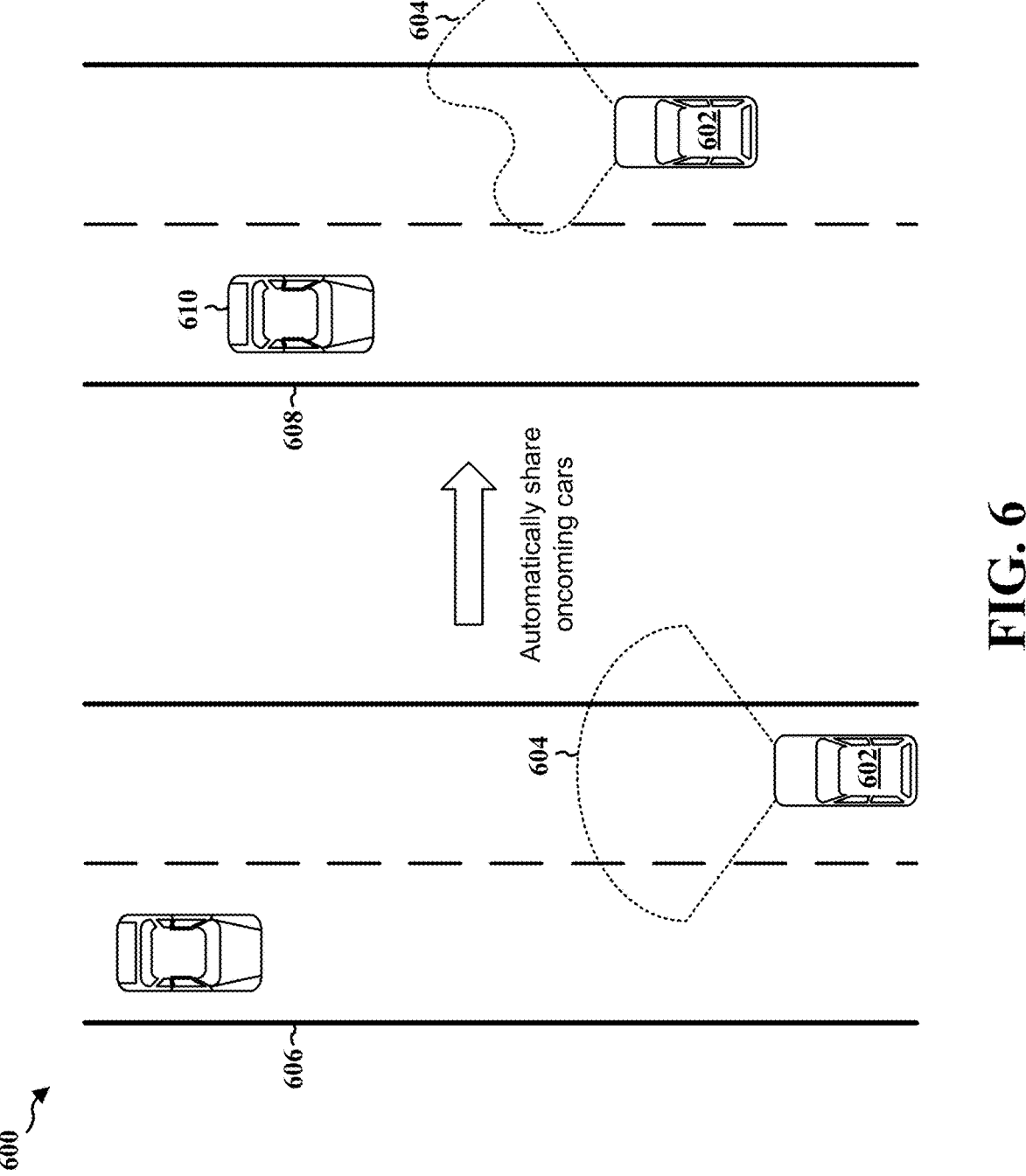
FIG. 6 is a diagram is a diagram illustrating an example of a UE (e.g., a vehicle, a vehicle UE) equipped with a headlight system that is capable of adjusting its light based on the incoming traffic in accordance with various aspects of the present disclosure.

FIG. 6 is a diagram 600 illustrating an example of a UE (e.g., a vehicle, a vehicle UE) equipped with a headlight system that is capable of adjusting its light or light pattern based on the incoming traffic in accordance with various aspects of the present disclosure. A vehicle 602 may be equipped with an adjustable headlight system, which may be referred to as a smart digital light processing (DLP) projector/lighting system in some examples.

As shown at 606, when there are no vehicles within a threshold distance of the vehicle 602, the headlight system of the vehicle 602 may be configured to illuminate headlight beams 604 evenly (e.g., using a first light pattern). However, a shown at 608, when the vehicle 602 detects that there is another vehicle 610 approaching the vehicle from the front (e.g., using radar sensors, Lidar sensors, etc.) and/or is within the threshold distance of the vehicle 602, the headlight system of the vehicle 602 may automatically adjust (e.g., reduce) the angle/direction and/or the strength of its headlight beams towards the vehicle 610 (e.g., using a second light pattern), such that the driver of the vehicle 610 is less likely to be affected by the headlight beams of the vehicle 602.

Figure 7:
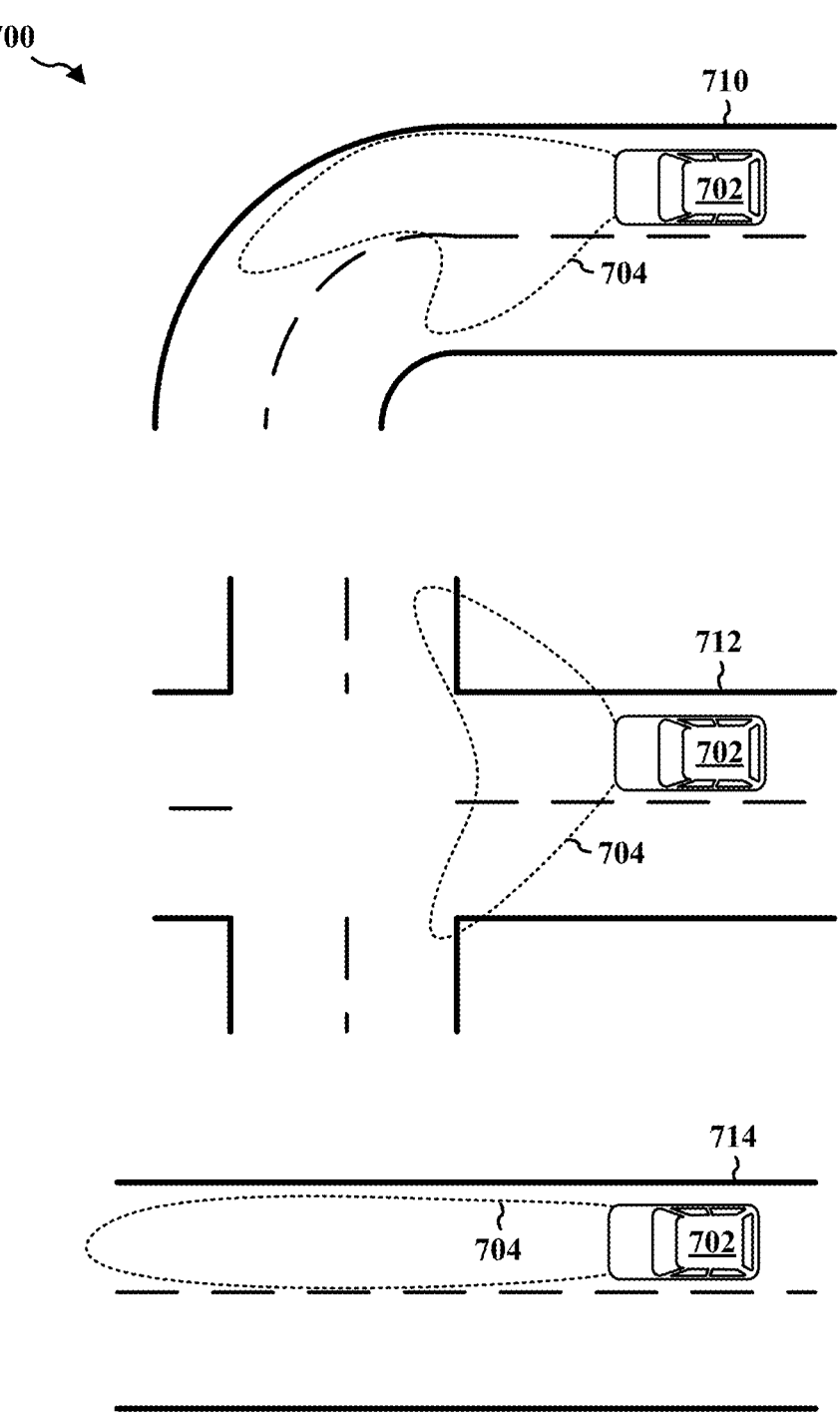
FIG. 7 is a diagram illustrating an example of a UE (e.g., a vehicle, a vehicle UE) equipped with a headlight system that is capable of changing light pattern while driving in accordance with various aspects of the present disclosure.

FIG. 7 is a diagram 700 illustrating an example of a UE (e.g., a vehicle, a vehicle UE) equipped with a headlight system that is capable of changing light patterns while driving in accordance with various aspects of the present disclosure. In some examples, an adjustable headlight system may also be configured to apply different headlight patterns based on the conditions of the road.

For example, as shown at 710, when a vehicle 702 is making turns, the headlight beams 704 of the vehicle 702 may also turn based on the turning degree and direction of the vehicle 702. As shown at 712, when the vehicle 702 is approaching an intersection, the headlight beams 704 of the vehicle 702 may be illuminated with a wider angle/range to enable the driver of the vehicle 702 to better see the traffics of the intersection. As shown at 714, when the vehicle 702 is driving on a long straight road, the headlight beams 704 of the vehicle 702 may be switched from a low beam to a high beam (e.g., or illuminated with a longer range) to enable the driver of the vehicle 702 to see further. In some examples, the light patterns may also be customized/adjusted by the user.

In one aspect of the present disclosure, a UE (e.g., a vehicle, a vehicle UE, a mobile device, etc.) may estimate/calculate a distance between the UE (or a camera of the UE) and an object based at least in part on the shadow of the object using triangulation, which may be referred to as "single camera feature localization" or "single camera feature localization using triangulation" for purposes of the present disclosure. In some scenarios, for VAPP using just one camera (e.g., a single camera case), the VAPP may not be sensitive to the depth information of feature(s) in an image captured by the camera. This may be referred to as the "depth ambiguity illusion" in CV. Resolving a feature depth can be very advantageous to VAPP. For purposes of the present disclosure, depth associated with an image/camera may refer to using photographic and/or compositional techniques to give the appearance that objects are three dimensional (3D) in a two dimensional (2D) photograph. For example, a depth image may provide the "depth" of an object or the "z" information of the object in the real world. The intensity values in the depth image may represent the distance of the object from a viewpoint. As such, in one aspect of the present disclosure, using a light source of a device (e.g., headlight of a vehicle, flashlight of a mobile phone, etc.), a geometry connection between the device and close-by feature(s) may be established with shadow. This may provide a distance (e.g., a radial distance, a linear distance, etc.) between the device and the feature(s) (i.e., the image depth, the depth of the feature(s) in the image, etc.).

Figure 8:
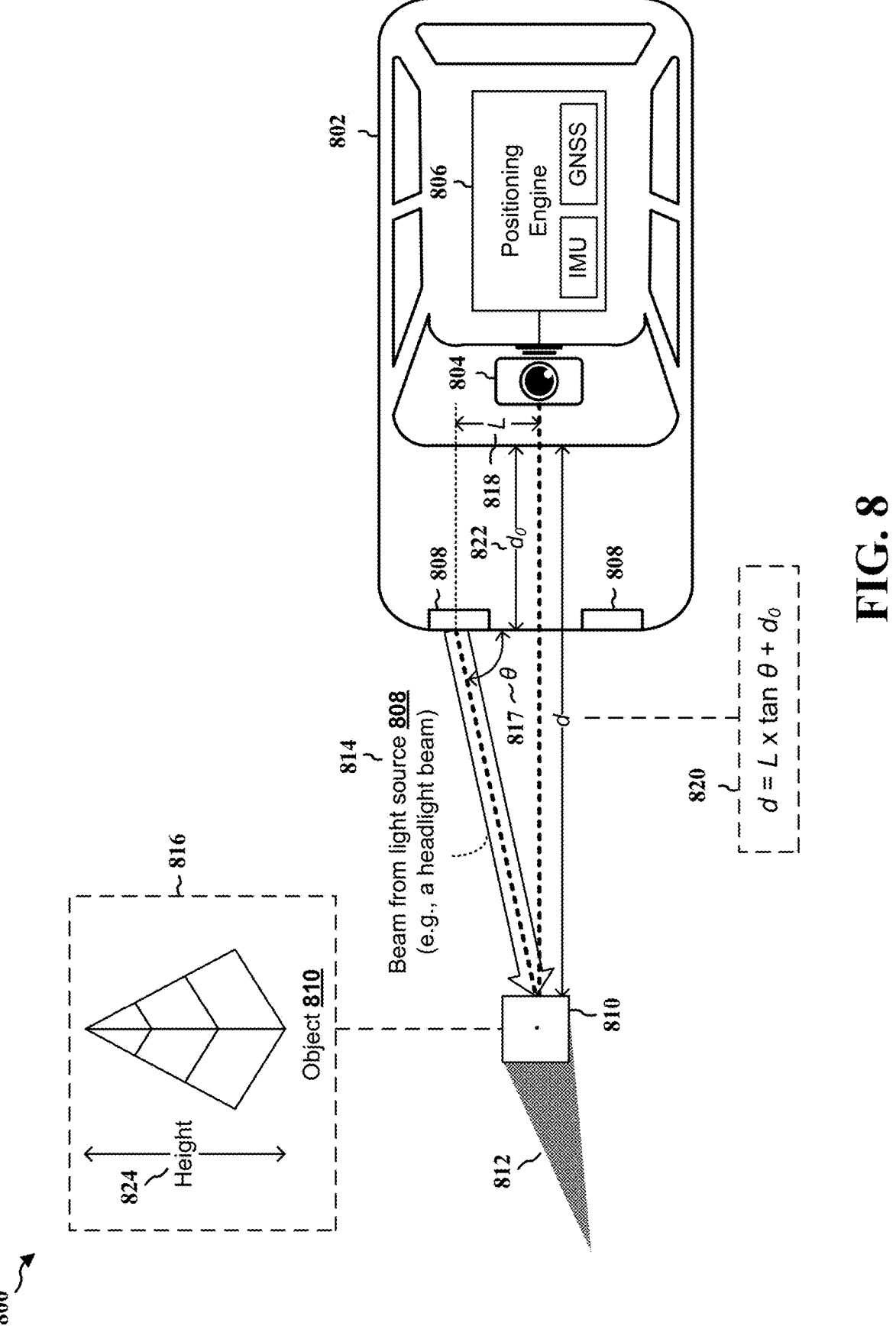
FIG. 8 is a diagram illustrating an example of a single camera feature localization using triangulation in accordance with various aspects of the present disclosure.

FIG. 8 is a diagram 800 illustrating an example of a single camera feature localization using triangulation in accordance with various aspects of the present disclosure. While FIG. 8 uses a vehicle and its headlight as an example, it is merely for illustration purposes. Aspects illustrated in connection with FIG. 8 may also apply to other types of devices (with at least one light source and a camera).

In one example, a vehicle 802 (which may also be referred to as a UE or a vehicle UE in some examples) may include a camera 804 (e.g., an image capturing system) that is capable of capturing images and/or recording videos. The camera 804 may also be associated with (e.g., connected to) a positioning engine 806 that is capable of using inputs (e.g., images captured by the camera 804, features extracted from the images, etc.) from the camera 804 to assist the positioning of a target, where the target may be the vehicle 802 itself or an object within the view of the camera 804, etc. The positioning of the target may include determining/estimating the absolute position of the target (e.g., its X-Y coordinates on a world coordinate system), determining/estimating a relative position of the target from a reference, and/or determining/estimating a distance between the target and a reference, etc. The positioning engine 806 may also be associated with a GNSS system that is capable of performing positioning based on GNSS signals and/or at least one IMU sensor that is capable of determining the 6-degrees-of-freedom (6 DOF) of the vehicle 802. In addition, the vehicle 802 may further include at least one light source 808, such as a headlight beam (e.g., a low beam, a high beam, a fog beam, etc.), that is capable of illuminating light. In some examples, the brightness (level), the distance, and/or the angle of the at least one light source 808 may be adjusted, such as described in connection with FIGS. 6 and 7.

As shown at 814, when the at least one light source 808 of the vehicle 802 illuminates and hits/reaches an object 810 (e.g., a nearby cone as depicted at 816) or a feature of the object 810, a shadow 812 of the object 810 may be created by the at least one light source 808. The image of the object 810 and its shadow 812 may be captured by the camera 804.

Going backward, the shadow 812 may then be used by the vehicle 802 (or by a processor associate with the vehicle 802 or by the positioning engine 806, etc.) to determine a direction of the at least one light source 808 via its camera 804 (e.g., the direction of the shadow 812 may be aligned with the direction of the at least one light source 808). Then, as shown at 817, the determined direction of the at least one light source 808 (or the shadow 812) may be used to derive a heading angle ($\theta$) of the vehicle 802 (e.g., a heading angle ($\theta$) with respect to the at least one light source 808).

In one example, as shown at 818, if a baseline length (L) between the at least one light source 808 and the camera 804 (e.g., from the center of the at least one light source 808 to the center of the lens of the camera 804) is known (e.g., based on surveying/resurveying, measurements from manufacture, etc.), then as shown at 820, a distance (d) between the object 810 (or its feature) from the camera 804 may be calculated/estimated based on $d = L \cdot \tan \theta + d_0$, where $d_0$ may be a camera depth bias (or distance between the camera 804 to the front of the vehicle 802) as shown at 822. The calculated/estimated distance (d) may then be used by the camera 804 for resolving the image depth (e.g., for determining the depth of one or more features in the images captured by the camera) and/or the depth ambiguity associated with one or more features/objects in the image. In some examples, such distance information (d) may also be used by the positioning engine 806 for performing the positioning of the vehicle 802, for improving its positioning (e.g., if the position of the object 810 is known), and/or for calibrating its sensors (e.g., the IMU sensor(s)), etc. In some examples, as shown at 824, the height of the object 810 may also be obtained/calculated from the shadow 812 if the aiming angle (e.g., the vertical direction/angle) of the at least one light source 808 is also known. As such, aspects presented herein may be used to improve the camera-aided positioning and/or camera-assisted positioning using artificial/non-natural lights.

In another aspect of the present disclosure, the dynamic of an object (or a feature of the object) may be estimated based on the shadow of the objects, where the estimated dynamic of the object may be utilized by a positioning engine for improving the localization/positioning of an object, such as updating the Kalman filter (KF) state of the 6 DOF. For example, in some VAPP, camera-aided positioning, and/or camera-assisted positioning configurations/implementations, a device or a positioning engine may be configured to choose just static feature(s) to update the KF state of 6 DOF. As such, static feature determination (e.g., determining whether a feature is static) and non-static feature removal (e.g., removing a non-static feature from processing/positioning) may be important for VAPP, camera-aided positioning, and/or camera-assisted positioning.

Figures 9A, 9B:
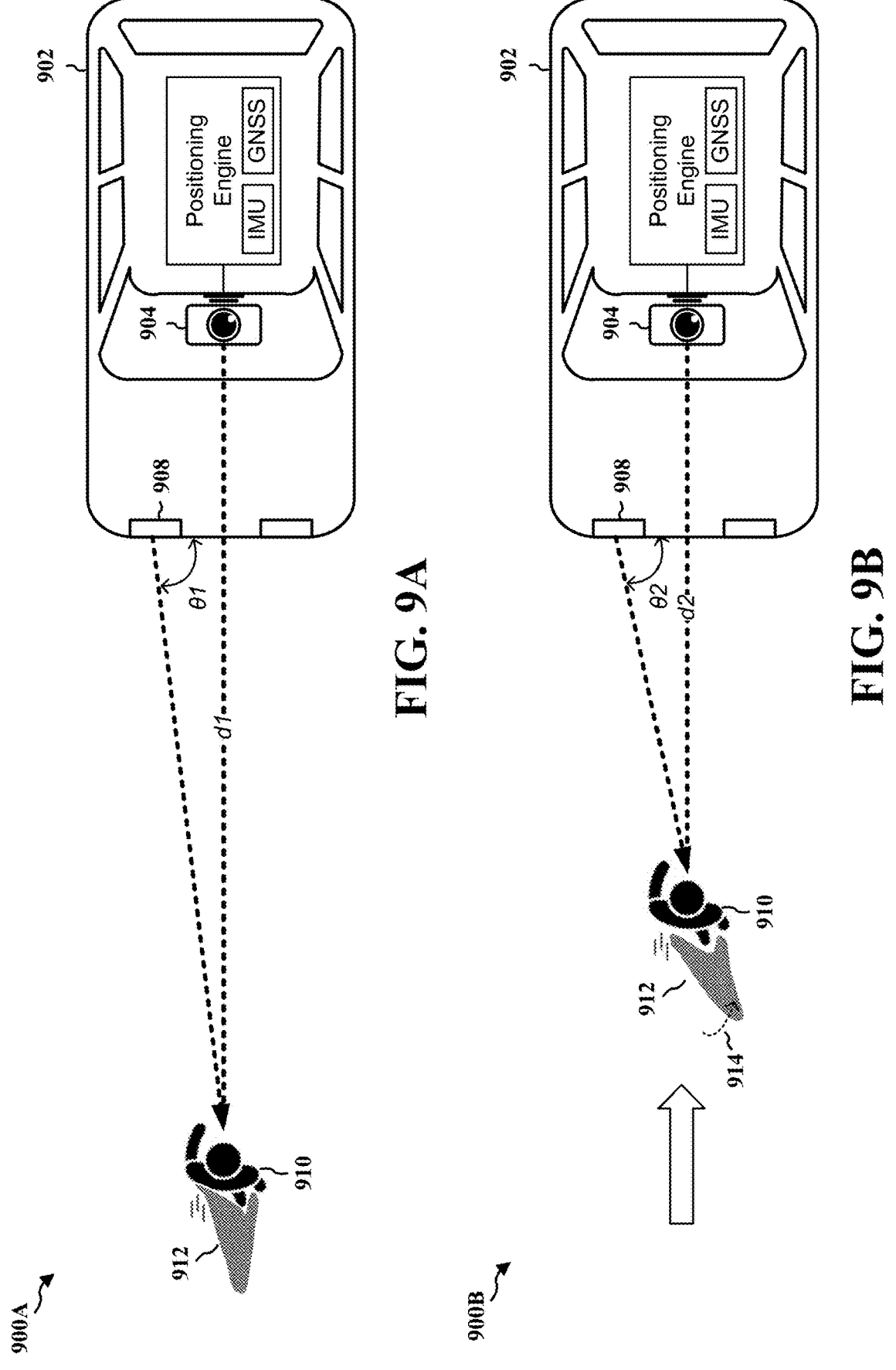
FIG. 9A is a diagram illustrating an example of a feature dynamic determination in accordance with various aspects of the present disclosure.
FIG. 9B is a diagram illustrating an example of a feature dynamic determination in accordance with various aspects of the present disclosure.

FIGS. 9A and 9B are diagrams 900A and 900B, respectively, illustrating an example of a feature dynamic determination in accordance with various aspects of the present disclosure. While FIGS. 9A and 9B use a vehicle and its headlight as an example, it is merely for illustration purposes. Aspects illustrated in connection with FIGS. 9A and 9B may also apply to other types of devices (with at least one light source and a camera).

A vehicle 902 (which may also be referred to as a UE or a vehicle UE in some examples) may include a camera 904 (e.g., an image capturing system) that is capable of capturing images and/or recording videos. The camera 904 may also be associated with (e.g., connected to) a positioning engine that is capable of using inputs (e.g., images captured by the camera 904, features extracted from the images, etc.) from the camera 904 to assist the positioning of a target, where the target may be the vehicle 902 itself or an object within the view of the camera 904, etc. The positioning engine may also be associated with a GNSS system that is capable of performing positioning based on GNSS signals and/or at least one IMU sensor that is capable of determining the 6-degrees-of-freedom (6 DOF) of the vehicle 902. In addition, the vehicle 902 may further include at least one light source 908, such as a headlight beam (e.g., a low beam, a high beam, a fog beam, etc.), that is capable of illuminating light. In some examples, the brightness (level), the distance, and/or the angle of the at least one light source 908 may be adjusted, such as described in connection with FIGS. 6 and 7.

In one example, using the at least one light source 908 of the vehicle 902, corresponding shadow locations of an object may be used to determine whether an object (or a feature) is static or not, such as when the object/feature is moving toward or away from the camera radially (e.g., zero/no cross-track movement). For purposes of the present disclosure, cross-track movement may refer to a motion/movement along a cross-track direction (perpendicular to the along-track direction). The along-track direction may typically be the same with the velocity direction of an object.). For example, as shown by the diagram 900A, when the at least one light source 908 hits an object 910 (e.g., a pedestrian), a shadow 912 of the object 910 may be created by the at least one light source 908. Then, based on the shadow 912, the vehicle 902 may determine the heading angle ($\theta$) of the vehicle 902 (or direction of the at least one light source 908 with respect to the object 910) and/or the distance between the camera 904 and the object 910, such as described in connection with FIG. 8.

As shown by the diagram 900B, when the object 910 is dynamic (e.g., moving), the position, the direction, and/or the length of the shadow 912 of the object 910 (created by the at least one light source 908) may change. For example, when the object 910 is moving toward the vehicle 902, as shown at 914, the shadow 912 may shift its position (e.g., counterclockwise) compared to the position/direction of the shadow 912 in the diagram 900A. In other words, when the object 910 is moving, the direction of the at least one light source 908 with respect to the object 910 and/or the distance between the camera 904 and the object 910 may change based on the movement of the object 910 (e.g., $\theta 1 \neq \theta 2 \rightarrow d1 \neq d2$). Based on the determination of whether the object 910 (or a feature) is moving, such information may be used to update the KF state of a positioning engine. Note for VAPP and camera-aided/assisted positioning, if an object is moving linearly towards a camera, it may be difficult for the camera to determine whether the object is moving (compared to the scenario where the object is moving horizontally in the view of the camera). Thus, determination of whether an object is moving may be useful in resolving the depth ambiguity of a feature.

Depending on implementations, there may be at least two feature dynamic determination modes. Under the first determination mode, the vehicle 902 may be moving but pattern of the at least one light source 908 (e.g., the headlight pattern) is configured to stay the same (e.g., illuminating towards a fixed direction with the same brightness). Then, the vehicle 902 may determine whether the object 910 is dynamic or static based on the change patterns in the shadow 912 of the object 910 (e.g., if the object 910 is static, the shadow 912 may be changed at a more fixed pattern compared to if the object is moving). The second determination may be based on light beamforming (e.g., headlight beamforming), where the direction of the at least one light source 908 may change while the vehicle 902 is stationary. Thus, when the object 910 or its feature is static, the shadow 912 may disappear after the direction of the at least one light source 908 changes. As such, shadow of an object may be used for increasing the feature dynamic resolution for a camera.

In another aspect of the present disclosure, the light and/or shadow of a feature may be used for estimating a heading direction of a device (e.g., a vehicle, a UE, etc.), and the estimated heading direction may be utilized by the device or a positioning engine for improving the positioning of a target and/or for calibrating one or more sensors (e.g., IMU sensor(s)). For example, the light and/or shadow from an object (e.g., a UE, a vehicle, etc.) may be aligned with the forward direction of a vehicle after calibration. In other words, when the vehicle is moving, lights and/or shadows from its surrounding objects may be used by the vehicle for estimating its heading direction.

Figure 10:
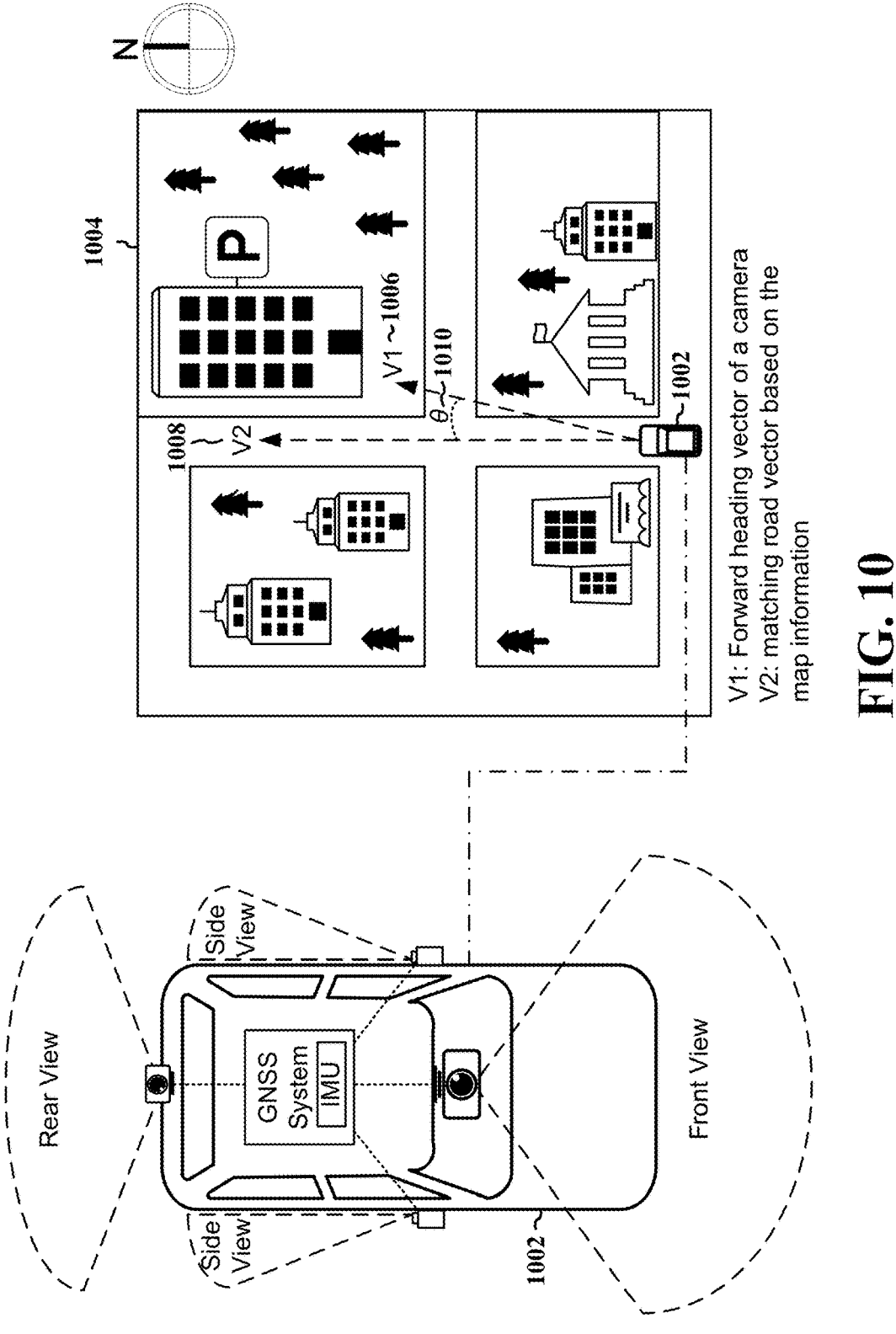
FIG. 10 is a diagram illustrating an example of a vehicle heading estimation based on light and/or shadow in accordance with various aspects of the present disclosure.

FIG. 10 is a diagram 1000 illustrating an example of a vehicle heading estimation based on light and/or shadow in accordance with various aspects of the present disclosure. While FIG. 10 uses a vehicle and its headlight as an example, it is merely for illustration purposes. Aspects illustrated in connection with FIG. 10 may also apply to other types of devices (with at least one light source and a camera).

As described in connection with FIG. 5, a vehicle 1002 may be equipped with a GNSS system and a set of cameras, which may include a front camera (for capturing the front view of the vehicle 1002), side cameras (for capturing the side views of the vehicle 1002), and/or a rear camera (for capturing the front view of the vehicle 1002), etc. In one example, the vehicle 1002 may be configured to generate a light/shadow map (e.g., a 2D light/shadow map) by first tracking light/shadow features of one or more objects (e.g., nearby environmental objects/features) from an image or images from multiple cameras, and identifying each light/shadow source information (e.g., where the light and shadow come from or are associated with, etc.). The light/shadow features of the one or more objects may be configured to be within a threshold distance of the vehicle 1002, and the nearby environmental object/features that can be captured by the camera of the vehicle 1002 (or visible to the camera of the vehicle 1002) may be collectively referred to as a surrounding environment of the vehicle 1002. Note that the camera(s) may not be specified to align with the frame of the vehicle 1002, e.g., the camera may be a smartphone sits and plugs on the vehicle 1002. Then, the vehicle 1002 may be configured to convert the tracked light/shadow features into a format to generate a light/shadow map. In some implementations, to avoid ambiguity, light/shadow features created/caused by non-vertical standing objects may be removed from heading estimation (as they may not provide suitable/useful information for heading estimation).

After the vehicle 1002 generates the light/shadow map, as shown at 1004, the vehicle 1002 may label vectors of the light/shadow features in the light/shadow map. For example, as shown at 1006, the vehicle 1002 may label the forward heading vector (V1) of a camera (e.g., the light source of the vehicle 1002) for one or more cameras. There may be multiple light/shadow vectors to be labelled in the light/shadow map. Then, as shown at 1008, the vehicle 1002 may identify/obtain matching road vector (V2) (e.g., the direction of each road) in the light/shadow map, which may be obtained from a map server that includes direction information of roads in the map.

As shown at 1010, based on the generated light/shadow map, the vehicle 1002 may compute the heading vector of a camera (e.g., V1) or a camera pose, and the heading of the vehicle 1002 may be estimated based on the computed heading vector of the camera and the shadow map. For example, based on using CV, as shown at 1010, the vehicle 1002 may estimate the angle ($\theta$) between the heading vector (V1) of one of its cameras and the road vector (V2) of a road it is travelling. Then, the vehicle 1002 may calculate/compute its heading direction based on the estimated angle ($\theta$). In some examples, the calculated/computed direction of the vehicle 1002 may also be used to quickly initializing the vehicle 1002's IMU sensor alignment without moving the vehicle 1002.

In another aspect of the present disclosure, the light and/or shadow of a target device (e.g., a UE, a vehicle, etc.) may be used by another device (e.g., another UE, another vehicle) for tracking the target device and/or making aware of the situations/conditions associated with the target device. This may be referred to as "nearby situation awareness" and/or "nearby "UE/vehicle localization and situation awareness for purposes of the present disclosure.

Figure 11:
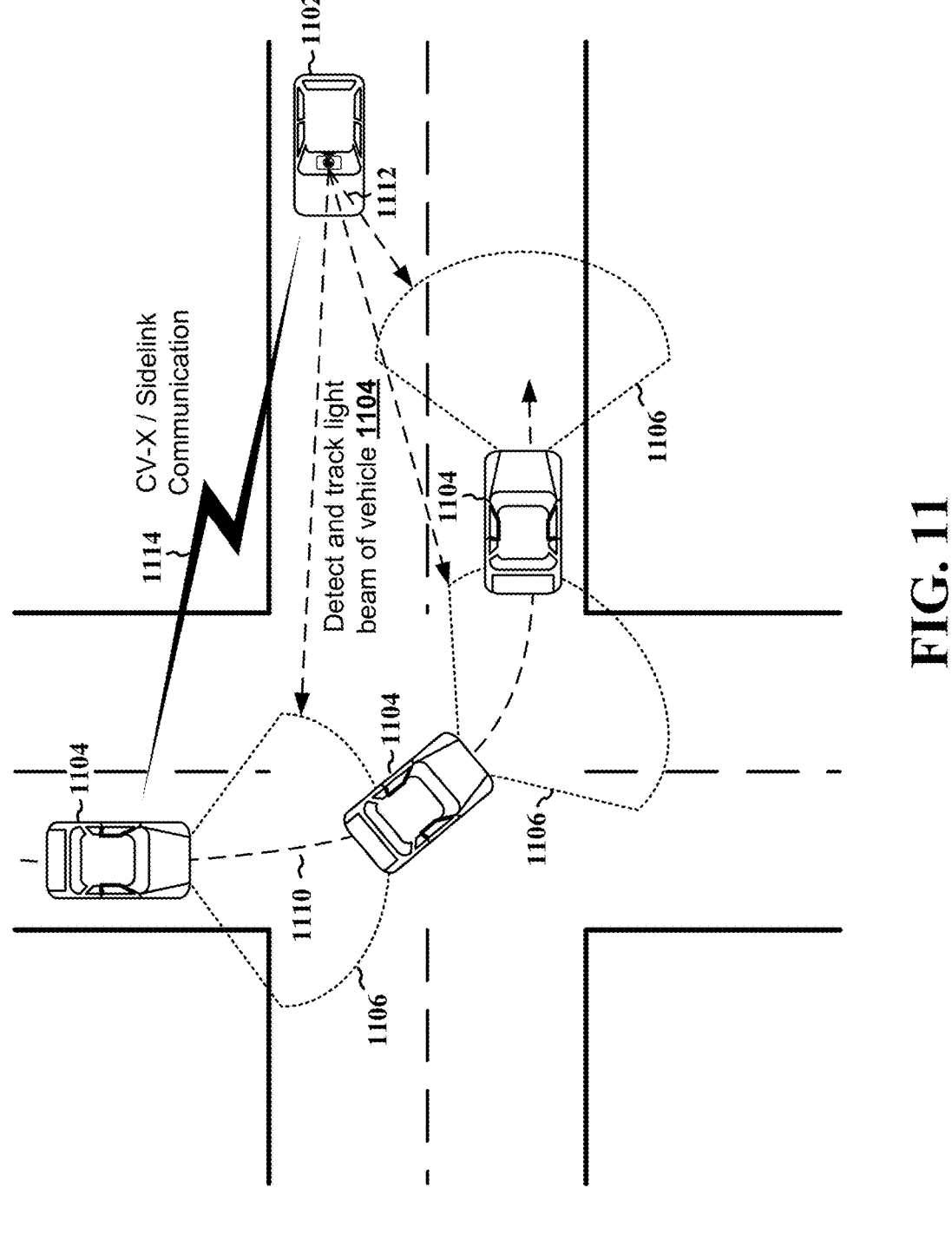
FIG. 11 is a diagram illustrating an example of localizing a vehicle and estimating its heading based on the light and/or shadow of the vehicle in accordance with various aspects of the present disclosure.

FIG. 11 is a diagram 1100 illustrating an example of localizing a vehicle and estimating its heading based on the light and/or shadow of the vehicle in accordance with various aspects of the present disclosure. While FIG. 11 uses a vehicle and its headlight as an example, it is merely for illustration purposes. Aspects illustrated in connection with FIG. 11 may also apply to other types of devices (with at least one light source and a camera).

In one example, the heading of nearby vehicles or UEs may be estimated by tracking their headlight pattern(s). For example, a first vehicle 1102 may be configured to use at least one of its cameras to detect and track vehicles on the road based on their headlights. As shown at 1110, when a second vehicle 1104 is approaching the first vehicle 1102 from an intersection and making turns, the first vehicle 1102 (or its camera) may detect the presence of the second vehicle 1104 based on the headlight beam 1106 of the second vehicle 1104. In addition, as shown at 1112, as the second vehicle 1104 is making turns, the first vehicle 1102 may also observe the changes in the direction of the headlight beam 1106 of the second vehicle 1104. Thus, based on the observation, the first vehicle 1102 may determine that the second vehicle 1104 making turns, and/or that the second vehicle 1104 is heading toward the first vehicle 1102, etc.

In some scenarios, if the nearby devices (e.g., UEs, vehicles, etc.) are associated/equipped with connected vehicle to everything (CV-X) and side-link capabilities/applications, the nearby devices may be configured to broadcast their location information (e.g., their coordinates), but their location information may not include information related to their heading directions. For example, as shown at 1114, the second vehicle 1104 may be configured to broadcast its location via sidelink (e.g., for safety purposes).

Based on receiving the location information broadcasted from the second vehicle 1104, the first vehicle 1102 may become aware of the presence of the second vehicle 1104. However, with the detection and tracking of the headlight beam 1106 of the second vehicle 1104 as shown at 1112, the first vehicle 1102 may be able to make a more accurate prediction or estimation regarding the position and heading of the second vehicle 1104, thereby improving the positioning of the second vehicle.

In another aspect of the present disclosure, the light and/or shadow of an object in an environment may be used by a device (e.g., a UE, a vehicle, etc.) for performing multipath and/or non-line-of-sight (NLOS) detection and mitigation for wireless communications, which may be referred to as multipath/NLOS radio frequency (RF) beacon mitigation in some examples.

Figure 12:
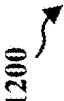
FIG. 12 is a diagram illustrating an example of a multipath/non-line-of-sight (NLOS) radio frequency (RF) beacon mitigation based on light and/or shadow of an object in accordance with various aspects of the present disclosure.

FIG. 12 is a diagram 1200 illustrating an example of a multipath/NLOS radio frequency (RF) beacon mitigation based on light and/or shadow of an object in accordance with various aspects of the present disclosure. While FIG. 12 uses a vehicle as an example, it is merely for illustration purposes. Aspects illustrated in connection with FIG. 12 may also apply to other types of devices (with at least one camera).

In one example, if a shadow 1212 caused by a nearby object 1210 of a vehicle 1202 is long or large, it may indicate that the object 1210 is tall (e.g., a building, a tall tree, etc.), such as described in connection with FIG. 7. Thus, it is likely that the object 1210 may block certain line-of-sight (LOS) communication (e.g., signals from a base station) or LOS RF beacon signals (e.g., signals from certain satellites) between the vehicle 1202 and the direction of the object 1210 (e.g., causing the communication/RF beacon signals to become NLOS/multipath). Then, based on the location information of the object 1210 derived from the shadow 1212 of the object 1210 as described in connection with FIG. 7, the vehicle 1202 may be able to compute a set of azimuth and elevation blockage ranges for RF signals receivers (e.g., mobile signals receiver, GNSS receiver, low Earth orbit (LEO) non-terrestrial network (NTN) receiver, etc.), thereby enabling the RF signals receiver to modify parameters associated with the reception of the RF signals.

For example, as shown at 1214, based on estimating the height and the location of the object 1210 using the shadow 1212 of the object 1210, the vehicle 1202 may determine that the object 1210 likely will block the communication between the vehicle 1202 and the direction of the object 1210 (e.g., the estimated height of the object 1210 exceeds a height threshold). Then, the vehicle 1202 may create a satellite skyplot (e.g., a plot that shows the locations of the satellites that are currently being tracked centered on the receiver's antenna location) that indicates receptions of GNSS signals from the direction/angle/range of the object 1210 are likely to be based on NLOS/multipath (this skyplot may be shared with other nearby vehicles depending on the implementation). Thus, the vehicle 1202 may take NLOS/multipath into account when receiving GNSS signals from satellites within this direction/angle/range (e.g., GNSS signals from satellites #3, #4, and #7, etc.).

In some implementations, a camera may be configured to identify whether a communication is LOS or NLOS based on whether there is an obstacle on the communication path (e.g., identified form its field of view (FOV)). However, when the camera is unable to see all obstacles in its limited FOV (e.g., the object is too far away, the color of the object resembles the background color, etc.), the shadow/lights of the obstacle may be used by the camera as supplement for determining whether there is an obstacle in its FOV.

Aspects described above may improve various positioning mechanisms. For example, during GNSS outage, IMU bias can degrade positioning accuracy and IMU bias can degrade sensor alignment/heading ambiguity with a static start. In one aspect, vision-aided precise positioning is used to mitigate issues related to IMU and GNSS coupling. Using a vehicle's headlight, a geometry connection between the vehicle and near-by features are established to obtain a radial distance between vehicle and the feature. In another aspect, using a vehicle's headlight and corresponding shadow locations are used to determine if an object is static or not. In another aspect, light shadow from the vehicle is used to determine vehicle heading/pose. In a further aspect, nearby UE/vehicle localization is estimated by tracking their headlight pattern. In situations where a camera cannot directly see all obstacles in a limited FOV, shadow caused by nearby objects can be used to determine azimuth and elevation blockage ranges for the GNSS and LEO NTN receivers. Aspects presented herein may apply to nighttime cases when visible features are less available, garage and tunnels scenario without low feature availability (static start), road condition is bad (low visibility land-mark), floor level positioning (elevated bridges), and/or indoor augmented reality (AR) and Internet-of-Things (IoT) use cases with camera, etc.

FIG. 13 is a flowchart 1300 of a method of wireless communication. The method may be performed by a UE (e.g., the UE 104, 404; the vehicle 502, 602, 702, 802, 902, 1002, 1102, 1202; the apparatus 1504). The method may improve/enhance camera-aided/assisted positioning (e.g., the VAPP) performed by the UE by utilizing artificial light and the shadow created by the artificial light, where light and/or shadow generated by different devices and/or environment may be used for aiding the positioning of a target (e.g., the UE itself or one or more objects in an environment).

At 1302, the UE may capture a set of images of an object using at least one camera, such as described in connection with FIG. 8. For example, the vehicle 802 may capture the image of the object 810 and its shadow 812 using the camera 804. The capturing of the set of images may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

At 1304, the UE may estimate a direction of at least one light source based on a shadow of the object in the set of images, where the shadow of the object is created by the at least one light source, such as described in connection with FIG. 8. For example, the shadow 812 of the object 810 may be used by the vehicle 802 to determine a direction of the at least one light source 808. Then, as shown at 817, the determined direction of the at least one light source 808 (or the shadow 812) may be used to derive a heading angle (θ) of the vehicle 802. The estimation of the direction may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

In one example, the UE is a vehicle or a vehicle UE, and where the at least one light source corresponds to at least one headlight beam of the vehicle or the vehicle UE.

In another example, the UE is a mobile device, and where the at least one light source corresponds to at least one flashlight of the mobile device.

At 1306, the UE may calculate at least one of (1) a distance (d) between the at least one camera and a set of first features associated with the object based on the estimated direction of the at least one light source or (2) directional information of a set of second features associated with a surrounding environment that is within a threshold distance of the object, such as described in connection with FIGS. 8 and 10. For example, as shown at 818 of FIG. 8, if a baseline length (L) between the at least one light source 808 and the camera 804 (e.g., from the center of the at least one light source 808 to the center of the lens of the camera 804) is known, then as shown at 820, a distance (d) between the object 810 (or its feature) from the camera 804 may be calculated/estimated based on $d=L \cdot \tan \theta+d_0$, where $d_0$ may be a camera depth bias (or distance between the camera 804 to the front of the vehicle 802) as shown at 822. In another example, as shown by FIG. 10, the vehicle 1002 may be configured to generate a light/shadow map by first tracking light/shadow features of one or more objects (e.g., nearby environmental objects/features) from an image or images from multiple cameras, and identifying each light/shadow source information (e.g., where the light and shadow come from or are associated with, etc.). The calculation of the distance or the directional information may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

In one example, the distance (d) between the at least one camera and the set of first features associated with the object may be derived based on: $d=l \cdot \tan \theta+_0$, where l is a headlight baseline length, $\theta$ is a heading angle derived from the direction of the at least one light source, and $d_0$ is a depth bias of the at least one camera.

In another example, the distance (d) is a radial distance.

In another example, the set of first features associated with the object may include at least one of a light or the shadow associated with the object.

In another example, the set of second features associated with the surrounding environment may include at least one of a light or a shadow associated with the surrounding environment.

In another example, the UE may determine an image depth for the set of first features associated with the object in the set of images based at least in part on the calculated distance (d), or resolve a depth ambiguity associated with the set of first features associated with the object in the set of images based at least in part on the calculated distance (d), such as described in connection with FIG. 8. For example, the calculated/estimated distance (d) may be used by the camera 804 for resolving the image depth (e.g., for determining the depth of one or more features in the images captured by the camera) and/or the depth ambiguity associated with one or more features/objects in the image. The determination of the image depth and/or the resolution of the depth ambiguity may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

In another example, the UE may estimate a position of the UE based on at least one of the calculated distance (d) or the calculated directional information, such as described in connection with FIG. 8. For example, the distance information (d) may also be used by the positioning engine 806 for performing the positioning of the vehicle 802, for improving its positioning (e.g., if the position of the object 810 is known), and/or for calibrating its sensors (e.g., the IMU sensor(s)), etc. The estimation of the position of the UE may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

In another example, the UE may calculate a height of the object based on at least one of (1) a length of the shadow of the object produced by the at least one light source and the object or (2) the direction of the at least one light source, such as described in connection with FIG. 8. For example, as shown at 824, the height of the object 810 may also be obtained/calculated from the shadow 812 if the aiming angle of the at least one light source 808 is also known. The calculation of the height of the object may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

In another example, the UE may determine whether the object is static or non-static; and update a Kalman filter (KF) associated with a positioning engine based on the determination of whether the object is static or non-static, such as described in connection with FIGS. 9A and 9B. For example, based on the determination of whether the object 910 (or a feature) is moving, such information may be used to update the KF state of a positioning engine. The determination of whether the object is static or non-static may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15. In some implementations, to determine whether the object is static or non-static, the UE may calculate changes in angles of the at least one light source between the at least one light source and the object while the UE is moving, or detect whether the shadow of the object changes or disappears by changing the direction of the at least one light source while the UE is stationary.

In another example, the UE may track at least one of the set of first features associated with the object, the shadow, a light of the object, the surrounding environment, or the set of second features associated with the surrounding environment, and estimate a heading direction of the UE based on the tracking and a map. In some implementations, the object may be a vertical standing object.

In another example, the UE may receive location information broadcasted from a second vehicle, and predict or estimate a location and a heading of the second vehicle based on the location information and a light beam direction of the second vehicle.

In another example, the UE may determine whether a communication associated with the UE is under a line-of-sight (LOS) condition or a non-line-of-sight (NLOS) condition based on the calculated directional information of the set of second features associated with the surrounding environment. In some implementations, the UE may calculate a set of azimuth and elevation blockage ranges for the communication in response to determining that the communication is under the NLOS condition.

FIG. 14 is a flowchart 1400 of a method of wireless communication. The method may be performed by a UE (e.g., the UE 104, 404; the vehicle 502, 602, 702, 802, 902,

1002, 1102, 1202; the apparatus 1504). The method may improve/enhance camera-aided/assisted positioning (e.g., the VAPP) performed by the UE by utilizing artificial light and the shadow created by the artificial light, where light and/or shadow generated by different devices and/or environment may be used for aiding the positioning of a target (e.g., the UE itself or one or more objects in an environment).

At 1402, the UE may capture a set of images of an object using at least one camera, such as described in connection with FIG. 8. For example, the vehicle 802 may capture the image of the object 810 and its shadow 812 using the camera 804. The capturing of the set of images may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

At 1404, the UE may estimate a direction of at least one light source based on a shadow of the object in the set of images, where the shadow of the object is created by the at least one light source, such as described in connection with FIG. 8. For example, the shadow 812 of the object 810 may be used by the vehicle 802 to determine a direction of the at least one light source 808. Then, as shown at 817, the determined direction of the at least one light source 808 (or the shadow 812) may be used to derive a heading angle ($\theta$) of the vehicle 802. The estimation of the direction may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

In one example, the UE is a vehicle or a vehicle UE, and where the at least one light source corresponds to at least one headlight beam of the vehicle or the vehicle UE.

In another example, the UE is a mobile device, and where the at least one light source corresponds to at least one flashlight of the mobile device.

At 1406, the UE may calculate at least one of (1) a distance (d) between the at least one camera and a set of first features associated with the object based on the estimated direction of the at least one light source or (2) directional information of a set of second features associated with a surrounding environment that is within a threshold distance of the object, such as described in connection with FIGS. 8 and 10. For example, as shown at 818 of FIG. 8, if a baseline length (L) between the at least one light source 808 and the camera 804 (e.g., from the center of the at least one light source 808 to the center of the lens of the camera 804) is known, then as shown at 820, a distance (d) between the object 810 (or its feature) from the camera 804 may be calculated/estimated based on $d=L\cdot\tan\theta+d_0$, where $d_0$ may be a camera depth bias (or distance between the camera 804 to the front of the vehicle 802) as shown at 822. In another example, as shown by FIG. 10, the vehicle 1002 may be configured to generate a light/shadow map by first tracking light/shadow features of one or more objects (e.g., nearby environmental objects/features) from an image or images from multiple cameras, and identifying each light/shadow source information (e.g., where the light and shadow come from or are associated with, etc.). The calculation of the distance or the directional information may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

In one example, the distance (d) between the at least one camera and the set of first features associated with the object may be derived based on: $d=l\cdot\tan\theta+d_0$, where l is a headlight baseline length, $\theta$ is a heading angle derived from the direction of the at least one light source, and $d_0$ is a depth bias of the at least one camera.

In another example, the distance (d) is a radial distance.

In another example, the set of first features associated with the object may include at least one of a light or the shadow associated with the object.

In another example, the set of second features associated with the surrounding environment may include at least one of a light or a shadow associated with the surrounding environment.

At 1408, the UE may determine an image depth for the set of first features associated with the object in the set of images based at least in part on the calculated distance (d), or resolve a depth ambiguity associated with the set of first features associated with the object in the set of images based at least in part on the calculated distance (d), such as described in connection with FIG. 8. For example, the calculated/estimated distance (d) may be used by the camera 804 for resolving the image depth (e.g., for determining the depth of one or more features in the images captured by the camera) and/or the depth ambiguity associated with one or more features/objects in the image. The determination of the image depth and/or the resolution of the depth ambiguity may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

At 1410, the UE may estimate a position of the UE based on at least one of the calculated distance (d) or the calculated directional information, such as described in connection with FIG. 8. For example, the distance information (d) may also be used by the positioning engine 806 for performing the positioning of the vehicle 802, for improving its positioning (e.g., if the position of the object 810 is known), and/or for calibrating its sensors (e.g., the IMU sensor(s)), etc. The estimation of the position of the UE may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

At 1412, the UE may calculate a height of the object based on at least one of (1) a length of the shadow of the object produced by the at least one light source and the object or (2) the direction of the at least one light source, such as described in connection with FIG. 8. For example, as shown at 824, the height of the object 810 may also be obtained/calculated from the shadow 812 if the aiming angle of the at least one light source 808 is also known. The calculation of the height of the object may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15.

At 1414, the UE may determine whether the object is static or non-static; and update a Kalman filter (KF) associated with a positioning engine based on the determination of whether the object is static or non-static, such as described in connection with FIGS. 9A and 9B. For example, based on the determination of whether the object 910 (or a feature) is moving, such information may be used to update the KF state of a positioning engine. The determination of whether the object is static or non-static may be performed by, e.g., the light/shadow detection component 198, the camera 1532, the light source(s) 1540, the transceiver(s) 1522, the cellular baseband processor(s) 1524, and/or the application processor(s) 1506 of the apparatus 1504 in FIG. 15. In some implementations, to determine whether the object is static or non-static, the UE may calculate changes in angles of the at least one light source between the at least one light source and the object while the UE is moving, or detect whether the shadow of the object changes or disappears by changing the direction of the at least one light source while the UE is stationary.

In one example, the UE may track at least one of the set of first features associated with the object, the shadow, a light of the object, the surrounding environment, or the set of second features associated with the surrounding environment, and estimate a heading direction of the UE based on the tracking and a map. In some implementations, the object may be a vertical standing object.

In another example, the UE may receive location information broadcasted from a second vehicle, and predict or estimate a location and a heading of the second vehicle based on the location information and a light beam direction of the second vehicle.

In another example, the UE may determine whether a communication associated with the UE is under a line-of-sight (LOS) condition or a non-line-of-sight (NLOS) condition based on the calculated directional information of the set of second features associated with the surrounding environment. In some implementations, the UE may calculate a set of azimuth and elevation blockage ranges for the communication in response to determining that the communication is under the NLOS condition.

Figure 15:
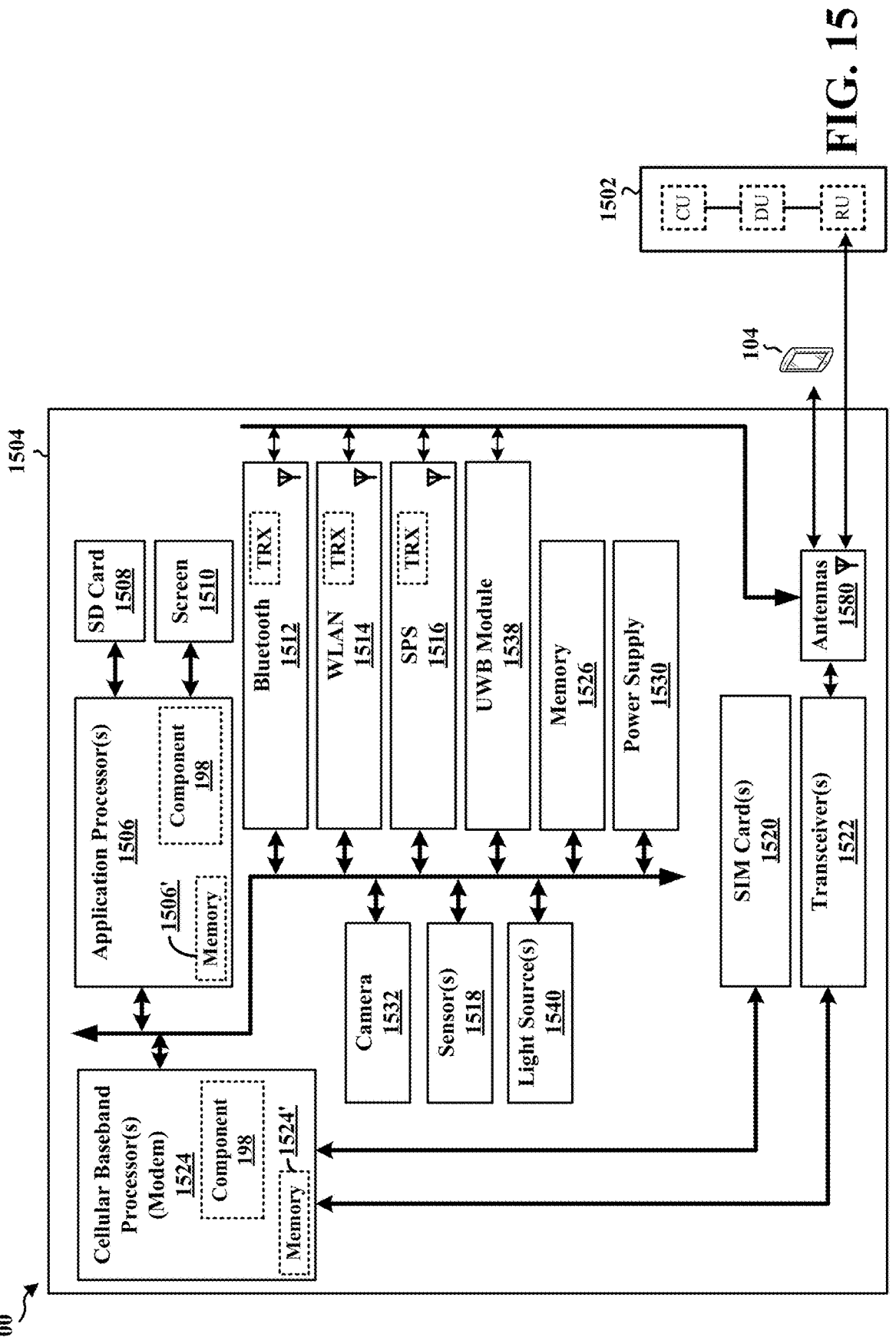
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an ultrawideband (UWB) module 1538, an SPS module 1516 (e.g., GNSS module), one or more sensor modules 1518 (e.g., barometric pressure sensor/altimeter; ultrawide band (UWB) sensor, motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, at least one light source 1540, and/or a camera 1532. The Bluetooth module 1512, the WLAN module 1514, the UWB module 1538, and the SPS module 1516 may include an on-chip transceiver (TRX) (or in some cases, just a receiver (RX)). The Bluetooth module 1512, the WLAN module 1514, the UWB module 1538, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/ memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the light/shadow detection component 198 may be configured to capture a set of images of an object using at least one camera. The light/shadow detection component 198 may also be configured to estimate a direction of at least one light source based on a shadow of the object in the set of images, where the shadow of the object is created by the at least one light source. The light/shadow detection component 198 may also be configured to calculate at least one of (1) a distance (d) between the at least one camera and a set of first features associated with the object based on the estimated direction of the at least one light source or (2) directional information of a set of second features associated with a surrounding environment that is within a threshold distance of the object. The light/shadow detection component 198 may be within the cellular baseband processor(s) 1524, the application processor(s) 1506, or both the cellular baseband processor(s) 1524 and the application processor(s) 1506. The light/shadow detection component 198 may be one or more hardware components specifically configured to carry out the stated processes/ algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for capturing a set of images of an object using at least one camera. The apparatus 1504 may further include means for estimating a direction of at least one light source based on a shadow of the object in the set of images, where the shadow of the object is created by the at least one light source. The apparatus 1504 may further include means for calculating at least one of (1) a distance (d) between the at least one camera and a set of first features associated with the object based on the estimated direction of the at least one light source or (2) directional information of a set of second features associated with a surrounding environment that is within a threshold distance of the object.

In one configuration, the apparatus 1504 is a vehicle or a vehicle UE, and where the at least one light source corresponds to at least one headlight beam of the vehicle or the vehicle UE.

In another configuration, the apparatus 1504 is a mobile device, and where the at least one light source corresponds to at least one flashlight of the mobile device.

In one configuration, the distance (d) between the at least one camera and the set of first features associated with the object may be derived based on: $d=l \cdot \tan \theta + d_0$, where $l$ is a headlight baseline length, $\theta$ is a heading angle derived from the direction of the at least one light source, and $d_0$ is a depth bias of the at least one camera.

In another configuration, the distance (d) is a radial distance.

In another configuration, the set of first features associated with the object may include at least one of a light or the shadow associated with the object.

In another configuration, the set of second features associated with the surrounding environment may include at least one of a light or a shadow associated with the surrounding environment.

In another configuration, the apparatus 1504 may further include means for determining an image depth for the set of first features associated with the object in the set of images based at least in part on the calculated distance (d), or means for resolving a depth ambiguity associated with the set of first features associated with the object in the set of images based at least in part on the calculated distance (d).

In another configuration, the apparatus 1504 may further include means for estimating a position of the UE based on at least one of the calculated distance (d) or the calculated directional information.

In another configuration, the apparatus 1504 may further include means for calculating a height of the object based on at least one of (1) a length of the shadow of the object produced by the at least one light source and the object or (2) the direction of the at least one light source.

In another configuration, the apparatus 1504 may further include means for determining whether the object is static or non-static; and means for updating a KF associated with a positioning engine based on the determination of whether the object is static or non-static. In some implementations, the means for determining whether the object is static or non-static may include configuring the apparatus 1504 to calculate changes in angles of the at least one light source between the at least one light source and the object while the apparatus 1504 is moving, or detect whether the shadow of the object changes or disappears by changing the direction of the at least one light source while the apparatus 1504 is stationary.

In another configuration, the apparatus 1504 may further include means for tracking at least one of the set of first features associated with the object, the shadow, a light of the object, the surrounding environment, or the set of second features associated with the surrounding environment, and means for estimating a heading direction of the UE based on the tracking and a map. In some implementations, the object may be a vertical standing object.

In another configuration, the apparatus 1504 may further include means for receiving location information broadcasted from a second vehicle, and means for predicting or means for estimating a location and a heading of the second vehicle based on the location information and a light beam direction of the second vehicle.

In another configuration, the apparatus 1504 may further include means for determining whether a communication associated with the UE is under a LOS condition or a NLOS condition based on the calculated directional information of the set of second features associated with the surrounding environment. In some implementations, the apparatus 1504 may further include means for calculating a set of azimuth and elevation blockage ranges for the communication in response to determining that the communication is under the NLOS condition.

The means may be the light/shadow detection component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: capturing a set of images of an object using at least one camera; estimating a direction of at least one light source based on a shadow of the object in the set of images, wherein the shadow of the object is created by the at least one light source; and calculating at least one of (1) a distance (d) between the at least one camera and a set of first features associated with the object based on the estimated direction of the at least one light source or (2) directional information of a set of second features associated with a surrounding environment that is within a threshold distance of the object.

Aspect 2 is the method of aspect 1, wherein the distance (d) between the at least one camera and the set of first features associated with the object is derived based on: $d=l\cdot\tan\theta+d_0$, where $l$ is a headlight baseline length, $\theta$ is a heading angle derived from the direction of the at least one light source, and $d_0$ is a depth bias of the at least one camera.

Aspect 3 is the method of aspect 1 or aspect 2, further comprising: determining an image depth for the set of first features associated with the object in the set of images based at least in part on the calculated distance (d); or resolving a depth ambiguity associated with the set of first features associated with the object in the set of images based at least in part on the calculated distance (d).

Aspect 4 is the method of any of aspects 1 to 3, further comprising: estimating a position of the UE based on at least one of the calculated distance (d) or the calculated directional information.

Aspect 5 is the method of any of aspects 1 to 4, further comprising: calculating a height of the object based on at least one of (1) a length of the shadow of the object produced by the at least one light source and the object or (2) the direction of the at least one light source.

Aspect 6 is the method of any of aspects 1 to 5, wherein the distance (d) is a radial distance.

Aspect 7 is the method of any of aspects 1 to 6, wherein the set of first features associated with the object includes at least one of a light or the shadow associated with the object.

Aspect 8 is the method of any of aspects 1 to 7, wherein the set of second features associated with the surrounding environment includes at least one of a light or a shadow associated with the surrounding environment.

Aspect 9 is the method of any of aspects 1 to 8, further comprising: determining whether the object is static or non-static; and updating a Kalman filter (KF) associated with a positioning engine based on the determination of whether the object is static or non-static.

Aspect 10 is the method of any of aspects 1 to 9, wherein determining whether the object is static or non-static comprises: calculating changes in angles of the at least one light source between the at least one light source and the object while the UE is moving, or detecting whether the shadow of the object changes or disappears by changing the direction of the at least one light source while the UE is stationary.

Aspect 11 is the method of any of aspects 1 to 10, further comprising: tracking at least one of the set of first features associated with the object, the shadow, a light of the object, the surrounding environment, or the set of second features associated with the surrounding environment; and estimating a heading direction of the UE based on the tracking and a map.

Aspect 12 is the method of any of aspects 1 to 11, wherein the object is a vertical standing object.

Aspect 13 is the method of any of aspects 1 to 12, further comprising: receiving location information broadcasted from a second vehicle; and predicting or estimating a location and a heading of the second vehicle based on the location information and a light beam direction of the second vehicle.

Aspect 14 is the method of any of aspects 1 to 13, further comprising: determining whether a communication associated with the UE is under a line-of-sight (LOS) condition or a non-line-of-sight (NLOS) condition based on the calculated directional information of the set of second features associated with the surrounding environment.

Aspect 15 is the method of any of aspects 1 to 14, further comprising: calculating a set of azimuth and elevation blockage ranges for the communication in response to determining that the communication is under the NLOS condition.

Aspect 16 is the method of any of aspects 1 to 15, wherein the UE is a vehicle or a vehicle UE, and wherein the at least one light source corresponds to at least one headlight beam of the vehicle or the vehicle UE.

Aspect 17 is the method of any of aspects 1 to 16, wherein the UE is a mobile device, and wherein the at least one light source corresponds to at least one flashlight of the mobile device.

Aspect 18 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 1 to 17.

Aspect 19 is the apparatus of aspect 18, further including at least one of a transceiver or an antenna coupled to the at least one processor.

Aspect 20 is an apparatus for wireless communication including means for implementing any of aspects 1 to 17.

Aspect 21 is a computer-readable medium (e.g., a non-transitory computer-readable medium) storing computer executable code, where the code when executed by a processor causes the processor to implement any of aspects 1 to 17.

What is claimed is:

1. An apparatus for wireless communication at a user equipment (UE), comprising:
a transceiver;
at least one memory; and
at least one processor coupled to the at least one memory and, based at least in part on information stored in the at least one memory, the at least one processor, individually or in any combination, is configured to:
capture a set of images of an object using at least one camera;
estimate a direction of at least one light source based on a shadow of the object in the set of images, wherein the shadow of the object is created by the at least one light source; and
calculate at least one of (1) a distance (d) between the at least one camera and a set of first features associated with the object based on the estimated direction of the at least one light source or (2) directional information of a set of second features associated with a surrounding environment that is within a threshold distance of the object, wherein the distance (d) between the at least one camera and the set of first features associated with the object is derived based on:

$$d = l \cdot \tan\theta + d_0,$$

where $l$ is a headlight baseline length, $\theta$ is a heading angle derived from the direction of the at least one light source, and $d_0$ is a depth bias of the at least one camera.

2. The apparatus of claim 1, wherein the at least one processor, individually or in any combination, is further configured to:
determine an image depth for the set of first features associated with the object in the set of images based at least in part on the calculated distance (d); or
resolve a depth ambiguity associated with the set of first features associated with the object in the set of images based at least in part on the calculated distance (d).

3. The apparatus of claim 1, wherein the at least one processor, individually or in any combination, is further configured to:
estimate a position of the UE based on at least one of the calculated distance (d) or the calculated directional information.

4. The apparatus of claim 1, wherein the at least one processor, individually or in any combination, is further configured to:

calculate a height of the object based on at least one of (1) a length of the shadow of the object produced by the at least one light source and the object or (2) the direction of the at least one light source.

5. The apparatus of claim 1, wherein the distance (d) is a radial distance.

6. The apparatus of claim 1, wherein the set of first features associated with the object includes at least one of a light or the shadow associated with the object.

7. The apparatus of claim 1, wherein the set of second features associated with the surrounding environment includes at least one of a light or a shadow associated with the surrounding environment.

8. The apparatus of claim 1, wherein the at least one processor, individually or in any combination, is further configured to:
determine whether the object is static or non-static; and
update a Kalman filter (KF) associated with a positioning engine based on the determination of whether the object is static or non-static.

9. The apparatus of claim 8, wherein to determine whether the object is static or non-static, the at least one processor, individually or in any combination, is configured to:
calculate changes in angles of the at least one light source between the at least one light source and the object while the UE is moving, or
detect whether the shadow of the object changes or disappears by changing the direction of the at least one light source while the UE is stationary.

10. The apparatus of claim 1, wherein the at least one processor, individually or in any combination, is further configured to:
track at least one of the set of first features associated with the object, the shadow, a light of the object, the surrounding environment, or the set of second features associated with the surrounding environment; and
estimate a heading direction of the UE based on the tracking and a map.

11. The apparatus of claim 10, wherein the object is a vertical standing object.

12. The apparatus of claim 1, wherein the at least one processor, individually or in any combination, is further configured to:
receive location information broadcasted from a second vehicle; and
predict or estimate a location and a heading of the second vehicle based on the location information and a light beam direction of the second vehicle.

13. The apparatus of claim 1, wherein the at least one processor, individually or in any combination, is further configured to:
determine whether a communication associated with the UE is under a line-of-sight (LOS) condition or a non-line-of-sight (NLOS) condition based on the calculated directional information of the set of second features associated with the surrounding environment.

14. The apparatus of claim 13, wherein the at least one processor, individually or in any combination, is further configured to:
calculate a set of azimuth and elevation blockage ranges for the communication in response to determining that the communication is under the NLOS condition.

15. The apparatus of claim 1, wherein the UE is a vehicle or a vehicle UE, and wherein the at least one light source corresponds to at least one headlight beam of the vehicle or the vehicle UE.

16. The apparatus of claim 1, wherein the UE is a mobile device, and wherein the at least one light source corresponds to at least one flashlight of the mobile device.

17. A method of wireless communication at a user equipment (UE), comprising:

capturing a set of images of an object using at least one camera;

estimating a direction of at least one light source based on a shadow of the object in the set of images, wherein the shadow of the object is created by the at least one light source; and calculating at least one of (1) a distance (d) between the at least one camera and a set of first features associated with the object based on the estimated direction of the at least one light source or (2) directional information of a set of second features associated with a surrounding environment that is within a threshold distance of the object, wherein the distance (d) between the at least one camera and the set of first features associated with the object is derived based on:

$$d = l \cdot \tan\theta + d_0,$$

where l is a headlight baseline length, $\theta$ is a heading angle derived from the direction of the at least one light source, and $d_0$ is a depth bias of the at least one camera.

18. The method of claim 17, further comprising:

determining an image depth for the set of first features associated with the object in the set of images based at least in part on the calculated distance (d); or resolving a depth ambiguity associated with the set of first features associated with the object in the set of images based at least in part on the calculated distance (d).

19. The method of claim 17, further comprising:

estimating a position of the UE based on at least one of the calculated distance (d) or the calculated directional information.

20. The method of claim 17, further comprising:

calculating a height of the object based on at least one of (1) a length of the shadow of the object produced by the at least one light source and the object or (2) the direction of the at least one light source.

21. The method of claim 17, further comprising:

determining whether the object is static or non-static; and updating a Kalman filter (KF) associated with a positioning engine based on the determination of whether the object is static or non-static.

22. The method of claim 21, wherein determining whether the object is static or non-static comprises:

calculating changes in angles of the at least one light source between the at least one light source and the object while the UE is moving, or detecting whether the shadow of the object changes or disappears by changing the direction of the at least one light source while the UE is stationary.

23. The method of claim 17, further comprising:

tracking at least one of the set of first features associated with the object, the shadow, a light of the object, the surrounding environment, or the set of second features associated with the surrounding environment; and estimating a heading direction of the UE based on the tracking and a map.

24. The method of claim 17, further comprising:

receiving location information broadcasted from a second vehicle; and predicting or estimating a location and a heading of the second vehicle based on the location information and a light beam direction of the second vehicle.

25. The method of claim 17, further comprising:

determining whether a communication associated with the UE is under a line-of-sight (LOS) condition or a non-line-of-sight (NLOS) condition based on the calculated directional information of the set of second features associated with the surrounding environment.

26. The method of claim 25, further comprising:

calculating a set of azimuth and elevation blockage ranges for the communication in response to determining that the communication is under the NLOS condition.

27. An apparatus for wireless communication at a user equipment (UE), comprising:

means for capturing a set of images of an object using at least one camera;

means for estimating a direction of at least one light source based on a shadow of the object in the set of images, wherein the shadow of the object is created by the at least one light source; and means for calculating at least one of (1) a distance (d) between the at least one camera and a set of first features associated with the object based on the estimated direction of the at least one light source or (2) directional information of a set of second features associated with a surrounding environment that is within a threshold distance of the object, wherein the distance (d) between the at least one camera and the set of first features associated with the object is derived based on:

$$d = l \cdot \tan\theta + d_0,$$

where l is a headlight baseline length, $\theta$ is a heading angle derived from the direction of the at least one light source, and $d_0$ is a depth bias of the at least one camera.

28. A non-transitory computer-readable medium storing computer executable code at a user equipment (UE), the code when executed by at least one processor causes the at least one processor to:

capture a set of images of an object using at least one camera;

estimate a direction of at least one light source based on a shadow of the object in the set of images, wherein the shadow of the object is created by the at least one light source; and calculate at least one of (1) a distance (d) between the at least one camera and a set of first features associated with the object based on the estimated direction of the at least one light source or (2) directional information of a set of second features associated with a surrounding environment that is within a threshold distance of the object, wherein the distance (d) between the at least one camera and the set of first features associated with the object is derived based on:

$$d = l \cdot \tan\theta + d_0,$$

where l is a headlight baseline length, $\theta$ is a heading angle derived from the direction of the at least one light source, and $d_0$ is a depth bias of the at least one camera.

* * * * *